US007471442B2

(12) United States Patent
Sampsell

(10) Patent No.: US 7,471,442 B2
(45) Date of Patent: Dec. 30, 2008

(54) METHOD AND APPARATUS FOR LOW RANGE BIT DEPTH ENHANCEMENTS FOR MEMS DISPLAY ARCHITECTURES

(75) Inventor: Jeffrey B. Sampsell, San Jose, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 259 days.

(21) Appl. No.: 11/454,162

(22) Filed: Jun. 15, 2006

(65) Prior Publication Data

US 2007/0290961 A1 Dec. 20, 2007

(51) Int. Cl.
*G02B 26/00* (2006.01)

(52) U.S. Cl. ....................................... 359/290; 359/237

(58) Field of Classification Search ......... 359/290–292, 359/296, 223–225, 298, 198, 301–303, 237, 359/242

See application file for complete search history.

(56) References Cited

U.S. PATENT DOCUMENTS 2,534,846 A 12/1950 Ambrose et al.
3,037,189 A 5/1962 Barrett et al.
3,210,757 A 10/1965 Jacob
3,439,973 A 4/1969 Paul et al.
3,443,854 A 5/1969 Weiss
3,653,741 A 4/1972 Marks
3,656,836 A 4/1972 de Cremoux et al.
3,725,868 A 4/1973 Malmer, Jr., et al.
3,813,265 A 5/1974 Marks
3,955,880 A 5/1976 Lierke
4,099,854 A 7/1978 Decker et al.
4,196,396 A 4/1980 Smith
4,228,437 A 10/1980 Shelton (Continued)

FOREIGN PATENT DOCUMENTS

CN 157313 5/1991

(Continued)

OTHER PUBLICATIONS

International Search Report and Written Opinion for PCT Application No. PCT/US2007/010499 dated Jan. 22, 2008.

(Continued)

*Primary Examiner*—Scott J Sugarman
*Assistant Examiner*—Dawayne A Pinkney
(74) *Attorney, Agent, or Firm*—Knobbe, Martens, Olson & Bear, LLP

(57) ABSTRACT

A light modulator device includes a first electrical conduit, a second electrical conduit electrically isolated from the first conduit, a first display element, and a second display element. The first display element is in an actuated state when a voltage difference between the first conduit and the second conduit has a magnitude greater than a first actuation voltage and is in a released state when the voltage difference has a magnitude less than a first release voltage. The second display element is in an actuated state when the voltage difference has a magnitude greater than a second actuation voltage and is in a released state when the voltage difference has a magnitude less than a second release voltage. Either the actuation voltages are substantially equal and the release voltages are different, or the actuation voltages are different and the release voltages are substantially equal.

23 Claims, 29 Drawing Sheets

U.S. PATENT DOCUMENTS

| | | | |
|---|---|---|---|
| 4,377,324 | A | 3/1983 | Durand et al. |
| 4,389,096 | A | 6/1983 | Hori et al. |
| 4,392,711 | A | 7/1983 | Moraw et al. |
| 4,403,248 | A | 9/1983 | te Velde |
| 4,441,791 | A | 4/1984 | Hornbeck |
| 4,445,050 | A | 4/1984 | Marks |
| 4,459,182 | A | 7/1984 | te Velde |
| 4,482,213 | A | 11/1984 | Piliavin et al. |
| 4,500,171 | A | 2/1985 | Penz et al. |
| 4,519,676 | A | 5/1985 | te Velde |
| 4,531,126 | A | 7/1985 | Sadones |
| 4,566,935 | A | 1/1986 | Hornbeck |
| 4,571,603 | A | 2/1986 | Hornbeck et al. |
| 4,596,992 | A | 6/1986 | Hornbeck |
| 4,615,595 | A | 10/1986 | Hornbeck |
| 4,662,746 | A | 5/1987 | Hornbeck |
| 4,663,083 | A | 5/1987 | Marks |
| 4,666,254 | A | 5/1987 | Itoh et al. |
| 4,681,403 | A | 7/1987 | te Velde et al. |
| 4,710,732 | A | 12/1987 | Hornbeck |
| 4,748,366 | A | 5/1988 | Taylor |
| 4,786,128 | A | 11/1988 | Birnbach |
| 4,790,635 | A | 12/1988 | Apsley |
| 4,856,863 | A | 8/1989 | Sampsell et al. |
| 4,857,978 | A | 8/1989 | Goldburt et al. |
| 4,859,060 | A | 8/1989 | Katagiri et al. |
| 4,900,136 | A | 2/1990 | Goldburt et al. |
| 4,900,395 | A | 2/1990 | Syverson et al. |
| 4,937,496 | A | 6/1990 | Neiger et al. |
| 4,954,789 | A | 9/1990 | Sampsell |
| 4,956,619 | A | 9/1990 | Hornbeck |
| 4,965,562 | A | 10/1990 | Verhulst |
| 4,982,184 | A | 1/1991 | Kirkwood |
| 5,018,256 | A | 5/1991 | Hornbeck |
| 5,022,745 | A | 6/1991 | Zayhowski et al. |
| 5,028,939 | A | 7/1991 | Hornbeck et al. |
| 5,037,173 | A | 8/1991 | Sampsell et al. |
| 5,044,736 | A | 9/1991 | Jaskie et al. |
| 5,061,049 | A | 10/1991 | Hornbeck |
| 5,075,796 | A | 12/1991 | Schildkraut et al. |
| 5,078,479 | A | 1/1992 | Vuilleumier |
| 5,079,544 | A | 1/1992 | DeMond et al. |
| 5,083,857 | A | 1/1992 | Hornbeck |
| 5,096,279 | A | 3/1992 | Hornbeck et al. |
| 5,099,353 | A | 3/1992 | Hornbeck |
| 5,124,834 | A | 6/1992 | Cusano et al. |
| 5,136,669 | A | 8/1992 | Gerdt |
| 5,142,405 | A | 8/1992 | Hornbeck |
| 5,142,414 | A | 8/1992 | Koehler |
| 5,153,771 | A | 10/1992 | Link et al. |
| 5,162,787 | A | 11/1992 | Thompson et al. |
| 5,168,406 | A | 12/1992 | Nelson |
| 5,170,156 | A | 12/1992 | DeMond et al. |
| 5,172,262 | A | 12/1992 | Hornbeck |
| 5,179,274 | A | 1/1993 | Sampsell |
| 5,192,395 | A | 3/1993 | Boysel et al. |
| 5,192,946 | A | 3/1993 | Thompson et al. |
| 5,206,629 | A | 4/1993 | DeMond et al. |
| 5,212,582 | A | 5/1993 | Nelson |
| 5,214,419 | A | 5/1993 | DeMond et al. |
| 5,214,420 | A | 5/1993 | Thompson et al. |
| 5,216,537 | A | 6/1993 | Hornbeck |
| 5,226,099 | A | 7/1993 | Mignardi et al. |
| 5,228,013 | A | 7/1993 | Bik |
| 5,231,532 | A | 7/1993 | Magel et al. |
| 5,233,385 | A | 8/1993 | Sampsell |
| 5,233,456 | A | 8/1993 | Nelson |
| 5,233,459 | A | 8/1993 | Bozler et al. |
| 5,254,980 | A | 10/1993 | Hendrix et al. |
| 5,272,473 | A | 12/1993 | Thompson et al. |
| 5,278,652 | A | 1/1994 | Urbanus et al. |

| | | | |
|---|---|---|---|
| 5,280,277 | A | 1/1994 | Hornbeck |
| 5,287,096 | A | 2/1994 | Thompson et al. |
| 5,293,272 | A | 3/1994 | Jannson et al. |
| 5,296,950 | A | 3/1994 | Lin et al. |
| 5,305,640 | A | 4/1994 | Boysel et al. |
| 5,311,360 | A | 5/1994 | Bloom et al. |
| 5,312,513 | A | 5/1994 | Florence et al. |
| 5,315,370 | A | 5/1994 | Bulow |
| 5,323,002 | A | 6/1994 | Sampsell et al. |
| 5,324,683 | A | 6/1994 | Fitch et al. |
| 5,325,116 | A | 6/1994 | Sampsell |
| 5,326,430 | A | 7/1994 | Cronin et al. |
| 5,327,286 | A | 7/1994 | Sampsell et al. |
| 5,331,454 | A | 7/1994 | Hornbeck |
| 5,339,116 | A | 8/1994 | Urbanus et al. |
| 5,345,328 | A | 9/1994 | Fritz et al. |
| 5,355,357 | A | 10/1994 | Yamamori et al. |
| 5,358,601 | A | 10/1994 | Cathey |
| 5,365,283 | A | 11/1994 | Doherty et al. |
| 5,381,232 | A | 1/1995 | Van Wijk |
| 5,381,253 | A | 1/1995 | Sharp et al. |
| 5,401,983 | A | 3/1995 | Jokerst et al. |
| 5,411,769 | A | 5/1995 | Hornbeck |
| 5,444,566 | A | 8/1995 | Gale et al. |
| 5,446,479 | A | 8/1995 | Thompson et al. |
| 5,448,314 | A | 9/1995 | Heimbuch et al. |
| 5,452,024 | A | 9/1995 | Sampsell |
| 5,454,906 | A | 10/1995 | Baker et al. |
| 5,457,493 | A | 10/1995 | Leddy et al. |
| 5,457,566 | A | 10/1995 | Sampsell et al. |
| 5,459,602 | A | 10/1995 | Sampsell |
| 5,459,610 | A | 10/1995 | Bloom et al. |
| 5,461,411 | A | 10/1995 | Florence et al. |
| 5,474,865 | A | 12/1995 | Vasudev |
| 5,489,952 | A | 2/1996 | Gove et al. |
| 5,497,172 | A | 3/1996 | Doherty et al. |
| 5,497,197 | A | 3/1996 | Gove et al. |
| 5,499,037 | A | 3/1996 | Nakagawa et al. |
| 5,499,062 | A | 3/1996 | Urbanus |
| 5,500,635 | A | 3/1996 | Mott |
| 5,500,761 | A | 3/1996 | Goossen et al. |
| 5,506,597 | A | 4/1996 | Thompson et al. |
| 5,515,076 | A | 5/1996 | Thompson et al. |
| 5,517,347 | A | 5/1996 | Sampsell |
| 5,523,803 | A | 6/1996 | Urbanus et al. |
| 5,526,051 | A | 6/1996 | Gove et al. |
| 5,526,172 | A | 6/1996 | Kanack |
| 5,526,327 | A | 6/1996 | Cordova, Jr. |
| 5,526,688 | A | 6/1996 | Boysel et al. |
| 5,535,047 | A | 7/1996 | Hornbeck |
| 5,548,301 | A | 8/1996 | Kornher et al. |
| 5,551,293 | A | 9/1996 | Boysel et al. |
| 5,552,924 | A | 9/1996 | Tregilgas |
| 5,552,925 | A | 9/1996 | Worley |
| 5,559,358 | A | 9/1996 | Burns et al. |
| 5,563,398 | A | 10/1996 | Sampsell |
| 5,567,334 | A | 10/1996 | Baker et al. |
| 5,570,135 | A | 10/1996 | Gove et al. |
| 5,579,149 | A | 11/1996 | Moret et al. |
| 5,581,272 | A | 12/1996 | Conner et al. |
| 5,583,688 | A | 12/1996 | Hornbeck |
| 5,589,852 | A | 12/1996 | Thompson et al. |
| 5,597,736 | A | 1/1997 | Sampsell |
| 5,600,383 | A | 2/1997 | Hornbeck |
| 5,602,671 | A | 2/1997 | Hornbeck |
| 5,606,441 | A | 2/1997 | Florence et al. |
| 5,608,468 | A | 3/1997 | Gove et al. |
| 5,610,438 | A | 3/1997 | Wallace et al. |
| 5,610,624 | A | 3/1997 | Bhuva |
| 5,610,625 | A | 3/1997 | Sampsell |
| 5,614,937 | A | 3/1997 | Nelson |
| 5,619,059 | A | 4/1997 | Li et al. |
| 5,619,365 | A | 4/1997 | Rhoades et al. |

5,619,366 A 4/1997 Rhoads et al.
5,629,790 A 5/1997 Neukermans et al.
5,633,652 A 5/1997 Kanbe et al.
5,636,052 A 6/1997 Arney et al.
5,636,185 A 6/1997 Brewer et al.
5,638,084 A 6/1997 Kalt
5,638,946 A 6/1997 Zavracky
5,641,391 A 6/1997 Hunter et al.
5,646,768 A 7/1997 Kaeiyama
5,650,881 A 7/1997 Hornbeck
5,654,741 A 8/1997 Sampsell et al.
5,657,099 A 8/1997 Doherty et al.
5,659,374 A 8/1997 Gale, Jr. et al.
5,661,591 A 8/1997 Lin et al.
5,665,997 A 9/1997 Weaver et al.
5,673,139 A 9/1997 Johnson
5,683,591 A 11/1997 Offenberg
5,703,710 A 12/1997 Brinkman et al.
5,710,656 A 1/1998 Goossen
5,726,480 A 3/1998 Pister
5,739,945 A 4/1998 Tayebati
5,740,150 A 4/1998 Uchimaru et al.
5,745,193 A 4/1998 Urbanus et al.
5,745,281 A 4/1998 Yi et al.
5,751,469 A 5/1998 Arney et al.
5,771,116 A 6/1998 Miller et al.
5,784,190 A 7/1998 Worley
5,784,212 A 7/1998 Hornbeck
5,786,927 A 7/1998 Greywall
5,793,504 A 8/1998 Stoll
5,808,780 A 9/1998 McDonald
5,808,781 A 9/1998 Arney et al.
5,818,095 A 10/1998 Sampsell
5,825,528 A 10/1998 Goossen
5,835,255 A 11/1998 Miles
5,838,484 A 11/1998 Goossen
5,842,088 A 11/1998 Thompson
5,905,482 A 5/1999 Hughes et al.
5,912,758 A 6/1999 Knipe et al.
5,943,158 A 8/1999 Ford et al.
5,959,763 A 9/1999 Bozler et al.
5,986,796 A 11/1999 Miles
5,994,174 A 11/1999 Carey et al.
6,028,690 A 2/2000 Carter et al.
6,038,056 A 3/2000 Florence et al.
6,040,937 A 3/2000 Miles
6,046,840 A 4/2000 Huibers
6,049,317 A 4/2000 Thompson et al.
6,055,090 A 4/2000 Miles
6,056,406 A 5/2000 Park
6,061,075 A 5/2000 Nelson et al.
6,097,145 A 8/2000 Kastalsky et al.
6,099,132 A 8/2000 Kaeriyama
6,100,872 A 8/2000 Aratani et al.
6,113,239 A 9/2000 Sampsell et al.
6,147,790 A 11/2000 Meier et al.
6,158,156 A 12/2000 Patrick
6,160,833 A 12/2000 Floyd et al.
6,171,945 B1 1/2001 Mandal et al.
6,172,797 B1 1/2001 Huibers
6,180,428 B1 1/2001 Peeters et al.
6,195,196 B1 2/2001 Koichi et al.
6,201,633 B1 3/2001 Peeters et al.
6,215,221 B1 4/2001 Cabuz et al.
6,232,936 B1 5/2001 Gove et al.
6,239,777 B1 5/2001 Sugahara Atsushi et al.
6,243,149 B1 6/2001 Swanson et al.
6,282,010 B1 8/2001 Sulzbach et al.
6,288,472 B1 9/2001 Cabuz et al.
6,288,824 B1 9/2001 Kastalsky
6,295,154 B1 9/2001 Laor et al.
6,323,982 B1 11/2001 Hornbeck
6,327,071 B1 12/2001 Kimura
6,331,909 B1 12/2001 Dunfield
6,335,831 B2 1/2002 Kowarz et al.
6,356,254 B1 3/2002 Kimura
6,356,378 B1 3/2002 Huibers
6,358,021 B1 3/2002 Cabuz
6,376,787 B1 4/2002 Martin et al.
6,407,851 B1 6/2002 Islam et al.
6,417,868 B1 7/2002 Bock herald Reinhart et al.
6,433,917 B1 8/2002 Mei et al.
6,438,282 B1 8/2002 Takeda et al.
6,447,126 B1 9/2002 Hornbeck
6,449,084 B1 9/2002 Guo
6,456,420 B1 9/2002 Goodwin-Johansson
6,465,355 B1 10/2002 Horsley
6,466,190 B1 10/2002 Evoy
6,466,354 B1 10/2002 Gudeman
6,466,358 B2 10/2002 Tew
6,473,072 B1 10/2002 Comiskey et al.
6,473,274 B1 10/2002 Maimone et al.
6,480,177 B2 11/2002 Doherty et al.
6,496,122 B2 12/2002 Sampsell
6,545,335 B1 4/2003 Chua et al.
6,548,908 B2 4/2003 Chua et al.
6,549,338 B1 4/2003 Wolverton et al.
6,552,840 B2 4/2003 Knipe
6,574,033 B1 6/2003 Chui et al.
6,589,625 B1 7/2003 Kothari et al.
6,600,201 B2 7/2003 Hartwell et al.
6,606,175 B1 8/2003 Sampsell et al.
6,608,268 B1 8/2003 Goldsmith
6,624,944 B1 9/2003 Wallace et al.
6,625,047 B2 9/2003 Coleman, Jr.
6,630,786 B2 10/2003 Cummings et al.
6,632,698 B2 10/2003 Ives
6,635,919 B1 10/2003 Melendez et al.
6,643,069 B2 11/2003 Dewald
6,650,455 B2 11/2003 Miles
6,657,832 B2 12/2003 Williams et al.
6,660,656 B2 12/2003 Cheung et al.
6,666,561 B1 12/2003 Blakley
6,674,033 B1 1/2004 Wang et al.
6,674,090 B1 1/2004 Chua et al.
6,674,562 B1 1/2004 Miles et al.
6,680,792 B2 1/2004 Miles
6,710,908 B2 3/2004 Miles et al.
6,741,377 B2 5/2004 Miles
6,741,383 B2 5/2004 Huibers et al.
6,741,384 B1 5/2004 Martin et al.
6,741,503 B1 5/2004 Farris et al.
6,747,785 B2 6/2004 Chen et al.
6,747,800 B1 6/2004 Lin
6,775,174 B2 8/2004 Huffman et al.
6,778,155 B2 8/2004 Doherty et al.
6,794,119 B2 9/2004 Miles
6,809,788 B2 10/2004 Yamada et al.
6,811,267 B1 11/2004 Allen et al.
6,819,469 B1 11/2004 Koha
6,822,628 B2 11/2004 Dunphy et al.
6,829,132 B2 12/2004 Martin et al.
6,853,129 B1 2/2005 Cummings et al.
6,855,610 B2 2/2005 Tung et al.
6,859,218 B1 2/2005 Luman et al.
6,861,277 B1 3/2005 Monroe et al.
6,862,022 B2 3/2005 Slupe
6,862,029 B1 3/2005 D'Souza et al.
6,867,896 B2 3/2005 Miles
6,870,581 B2 3/2005 Li et al.
6,870,654 B2 3/2005 Lin et al.
6,882,458 B2 4/2005 Lin et al.
6,882,461 B1 4/2005 Tsai et al.
6,891,658 B2 5/2005 Whitehead et al.
6,912,022 B2 6/2005 Lin et al.
6,947,200 B2 9/2005 Huibers 6,952,303 B2 10/2005 Lin et al.
6,958,847 B2 10/2005 Lin
6,959,990 B2 11/2005 Penn
7,008,812 B1 3/2006 Carley
7,053,737 B2 5/2006 Schwartz et al.
7,075,700 B2 7/2006 Muenter
7,123,216 B1 10/2006 Miles
7,161,728 B2 1/2007 Sampsell et al.
7,205,722 B2 4/2007 Koshio et al.
7,250,930 B2 7/2007 Hoffman et al.
7,289,259 B2 10/2007 Chui et al.
7,372,613 B2 5/2008 Chui et al.
2001/0003487 A1 6/2001 Miles
2001/0028503 A1 10/2001 Flanders et al.
2002/0014579 A1 2/2002 Dunfield
2002/0015215 A1 2/2002 Miles
2002/0021485 A1 2/2002 Pilossof
2002/0024711 A1 2/2002 Miles
2002/0027636 A1 3/2002 Yamada
2002/0054424 A1 5/2002 Miles
2002/0075555 A1 6/2002 Miles
2002/0114558 A1 8/2002 Nemirovsky
2002/0126364 A1 9/2002 Miles
2002/0139981 A1 10/2002 Young
2002/0146200 A1 10/2002 Kurdle et al.
2002/0149828 A1 10/2002 Miles
2002/0149850 A1 10/2002 Heffner et al.
2002/0167072 A1 11/2002 Andosca
2002/0167730 A1 11/2002 Needham et al.
2002/0186483 A1 12/2002 Hagelin et al.
2003/0015936 A1 1/2003 Yoon et al.
2003/0016428 A1 1/2003 Kato et al.
2003/0029705 A1 2/2003 Qui et al.
2003/0035196 A1 2/2003 Walker
2003/0043157 A1 3/2003 Miles
2003/0053078 A1 3/2003 Missey et al.
2003/0072070 A1 4/2003 Miles
2003/0156315 A1 8/2003 Li et al.
2003/0202264 A1 10/2003 Weber
2003/0202265 A1 10/2003 Reboa et al.
2003/0202266 A1 10/2003 Ring et al.
2003/0210851 A1 11/2003 Fu et al.
2004/0008396 A1 1/2004 Stappaerts
2004/0008438 A1 1/2004 Sato Akinobu
2004/0027671 A1 2/2004 Wu et al.
2004/0027701 A1 2/2004 Ishikawa
2004/0051929 A1 3/2004 Sampsell et al.
2004/0056742 A1 3/2004 Dabbaj
2004/0058532 A1 3/2004 Miles et al.
2004/0075967 A1 4/2004 Lynch et al.
2004/0080035 A1 4/2004 Delapierre
2004/0080807 A1 4/2004 Chen et al.
2004/0100594 A1 5/2004 Huibers et al.
2004/0100677 A1 5/2004 Huibers et al.
2004/0100680 A1 5/2004 Huibers et al.
2004/0124483 A1 7/2004 Partridge et al.
2004/0125281 A1 7/2004 Lin et al.
2004/0125347 A1 7/2004 Patel et al.
2004/0136045 A1 7/2004 Tran
2004/0140557 A1 7/2004 Sun Yi-Sheng et al.
2004/0145049 A1 7/2004 McKinnell et al.
2004/0145811 A1 7/2004 Lin et al.
2004/0147056 A1 7/2004 McKinnell et al.
2004/0147198 A1 7/2004 Lin et al.
2004/0148009 A1 7/2004 Buzzard et al.
2004/0150939 A1 8/2004 Huff
2004/0160143 A1 8/2004 Shreeve et al.
2004/0174583 A1 9/2004 Chen et al.
2004/0175577 A1 9/2004 Lin et al.
2004/0179281 A1 9/2004 Reboa
2004/0179445 A1 9/2004 Park et al.
2004/0184766 A1 9/2004 Kim et al.
2004/0201908 A1 10/2004 Kaneko
2004/0207897 A1 10/2004 Lin
2004/0209192 A1 10/2004 Lin et al.
2004/0209195 A1 10/2004 Lin
2004/0212026 A1 10/2004 Van Brooklin et al.
2004/0217378 A1 11/2004 Martin et al.
2004/0217919 A1 11/2004 Pichi et al.
2004/0218251 A1 11/2004 Piehl et al.
2004/0218334 A1 11/2004 Martin et al.
2004/0218341 A1 11/2004 Martin et al.
2004/0227493 A1 11/2004 Van Brocklin et al.
2004/0233503 A1 11/2004 Kimura
2004/0240032 A1 12/2004 Miles
2004/0240138 A1 12/2004 Martin et al.
2004/0245588 A1 12/2004 Nikkel et al.
2004/0263944 A1 12/2004 Miles et al.
2005/0001828 A1 1/2005 Martin et al.
2005/0002082 A1 1/2005 Miles
2005/0003667 A1 1/2005 Lin et al.
2005/0014374 A1 1/2005 Partridge et al.
2005/0024557 A1 2/2005 Lin
2005/0035699 A1 2/2005 Tsai
2005/0036095 A1 2/2005 Yeh et al.
2005/0036192 A1 2/2005 Lin et al.
2005/0038950 A1 2/2005 Adelmann
2005/0042117 A1 2/2005 Lin
2005/0046922 A1 3/2005 Lin et al.
2005/0046948 A1 3/2005 Lin
2005/0057442 A1 3/2005 Way
2005/0068583 A1 3/2005 Gutkowski et al.
2005/0068605 A1 3/2005 Tsai
2005/0068606 A1 3/2005 Tsai
2005/0069209 A1 3/2005 Damera-Vankata et al.
2005/0078348 A1 4/2005 Lin
2005/0122294 A1 6/2005 Ben-David et al.
2005/0157364 A1 7/2005 Lin
2005/0168849 A1 8/2005 Lin
2005/0195462 A1 9/2005 Lin
2005/0195467 A1 9/2005 Kothari et al.
2005/0202649 A1 9/2005 Hung et al.
2005/0206991 A1* 9/2005 Chui et al. .................. 359/290
2005/0249966 A1 11/2005 Tung et al.
2006/0007517 A1 1/2006 Tsai
2006/0024880 A1 2/2006 Chui et al.
2006/0033975 A1 2/2006 Miles
2006/0044654 A1 3/2006 Vandorpe et al.
2006/0065940 A1 3/2006 Kothari
2006/0066599 A1 3/2006 Chui
2006/0066640 A1 3/2006 Kothari et al.
2006/0066935 A1 3/2006 Cummings
2006/0067643 A1 3/2006 Chui
2006/0067649 A1 3/2006 Tung et al.
2006/0067651 A1 3/2006 Chui
2006/0077152 A1 4/2006 Chui et al.
2006/0077155 A1 4/2006 Chui et al.
2006/0077156 A1 4/2006 Chui et al.
2006/0077507 A1 4/2006 Chui et al.
2006/0077508 A1 4/2006 Chui et al.
2006/0077515 A1 4/2006 Cummings et al.
2006/0077516 A1 4/2006 Kothari
2006/0077527 A1 4/2006 Cummings et al.
2006/0077533 A1 4/2006 Miles et al.
2006/0079048 A1 4/2006 Sampsell
2006/0139723 A9 6/2006 Miles
2007/0035805 A1* 2/2007 Chui et al. .................. 359/290
2007/0229936 A1 10/2007 Miles
2008/0037093 A1 2/2008 Miles
2008/0055705 A1 3/2008 Kothari
2008/0055706 A1 3/2008 Chui et al.
2008/0088904 A1 4/2008 Miles
2008/0088911 A1 4/2008 Miles
2008/0088912 A1 4/2008 Miles
2008/0106782 A1 5/2008 Miles
2008/0110855 A1 5/2008 Cummings

| | | | |
|---|---|---|---|
| 2008/0112035 A1 | 5/2008 | Cummings | |
| 2008/0112036 A1 | 5/2008 | Cummings | |

FOREIGN PATENT DOCUMENTS

| | | | |
|---|---|---|---|
| DE | 4108966 | A1 | 9/1992 |
| DE | 10228946 | A1 | 1/2004 |
| EP | 0 310 176 | A2 | 4/1989 |
| EP | 0 361 981 | | 4/1990 |
| EP | 0 667 548 | A1 | 8/1995 |
| EP | 0 788 005 | | 8/1997 |
| EP | 1275997 | | 1/2003 |
| EP | 1 435 336 | | 7/2004 |
| EP | 1 439 515 | | 7/2004 |
| EP | 1439515 | | 7/2004 |
| EP | 1 473 691 | A | 11/2004 |
| EP | 1473581 | A2 | 11/2004 |
| EP | 1 484 635 | | 12/2004 |
| EP | 1 630 779 | | 3/2006 |
| EP | 1 640 944 | | 3/2006 |
| EP | 1630779 | | 3/2006 |
| EP | 1640944 | | 3/2006 |
| FR | 2 824 643 | A | 11/2002 |
| JP | 62 082454 | | 4/1987 |
| JP | 05275401 | A1 | 10/1993 |
| JP | 9-127439 | | 5/1997 |
| JP | 11211999 | | 8/1999 |
| JP | 2000306515 | A | 11/2000 |
| JP | 2002-062490 | | 2/2002 |
| JP | 2002277771 | A | 9/2002 |
| JP | 2003195201 | | 7/2003 |
| JP | 2003195201 | A | 7/2003 |
| JP | 2004157527 | A | 6/2004 |
| JP | 2004235465 | A | 8/2004 |
| JP | 2004286825 | A | 10/2004 |
| WO | WO 95/30924 | | 11/1995 |
| WO | WO 97/17628 | | 5/1997 |
| WO | WO 99/52006 | A2 | 10/1999 |
| WO | WO 99/52006 | A3 | 10/1999 |
| WO | WO 02/079853 | | 10/2002 |
| WO | WO 03/007049 | A1 | 1/2003 |
| WO | WO 03/014789 | A2 | 2/2003 |
| WO | WO 03/054925 | | 7/2003 |
| WO | WO 03/069404 | | 8/2003 |
| WO | WO 03/069413 | A1 | 8/2003 |
| WO | WO 03/073151 | A1 | 9/2003 |
| WO | WO 03/085728 | A1 | 10/2003 |
| WO | WO 2004/006003 | A1 | 1/2004 |
| WO | WO 2004/026757 | A2 | 4/2004 |
| WO | WO 2004/042687 | | 5/2004 |
| WO | WO 2005/006364 | A1 | 1/2005 |
| WO | WO 2005/010566 | | 2/2005 |
| WO | WO 2006/014929 | | 2/2006 |
| WO | WO 2006/036427 | | 4/2006 |

OTHER PUBLICATIONS

ISR and WO for PCT/US07/010499 filed Apr. 30, 2007.
Akasaka, "Three-Dimensional IC Trends", Proceedings of IEEE, vol. 74, No. 12, pp. 1703-1714, (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K., et al., "Surface micromachined tuneable interferometer array," Sensors and Actuators, pp. 17-23. (1994).
Bass, "Handbook of Optics, vol. I, Fundamentals, Techniques, and Design, Second Edition," McGraw-Hill, Inc., New York, pp. 2.29-2.36 (1995).
Butler et al., "An Embedded Overlay Concept for Microsystems Packaging," IEEE Transactions on Advanced Packaging IEEE USA, vol. 23, No. 4, pp. 617-622, XP002379648 (2000).
Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.
Chunjun Wang et al., "Flexible curcuit-based RF MEMS Switches," MEMS. XP002379649 pp. 757-762, (Nov. 2001).
Conner, "Hybrid Color Display Using Optical Interference Filter Array," SID Digest, pp. 577-580 (1993).
Fan et al., "Channel Drop Filters in Photonic Crystals, "Optics Express, vol. 3, No. 1, 1998.
Fork, et al., "P-67: Chip on Glass Bonding using StressedMetal™ Technology" Sid 05 Digest, May 24, 2005.
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).
Goossen, "MEMS-based variable optical interference device," Optical MEMS, 2000 IEEE/LEDS Int'l. Conf. on Aug. 21-24, 2000, Piscatawny, NJ, Aug. 21, 2000, pp. 17-18.
Gosch, "West Germany Grabs the Lead in X-Ray Lithography," Electronics pp. 78-80 (Feb. 5, 1987).
Howard et al., "Nanometer-Scale Fabrication Techniques", VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics", John Wiley & Sons Inc., pp. 568-573. (date unknown).
Jerman et al., "A Miniature Fabry-Perot Interferometer with a Corrugated Silicon Diaphragm Support", (1988).
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF.6, Jun. 24, 1991, pp. 372-375.
Joannopoulos et al., "Molding the Flow of Light," Photonic Crystals. 1995.
Johnson "Optical Scanners", Microwave Scanning Antennas, vol. 1, p. 251-261, (1964).
Kim et al., "Control of Optical Transmission Through metals Perforated With Subwave-Length Hole Arrays," Optic Letters, vol. 24, No. 4, Feb. 15, 1999, pp. 256-257.
Circle 36: Light over Matter, Circle No. 36 (Jun. 1993).
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-3/1996.
Miles, Mark, W., "A New Reflective FPD Technology Using Interferometric Modulation", The Proceedings of the Society for Information Display (May 11-16, 1997).
Nagami et al., "Plastic Cell Architecture: Towards Reconfigurable Computing for General-Purpose," Proc. IEEE Workshop on FPGA-based Custom Computing Machines, (1998).
Newsbreaks, "Quantum-trench devices might operate at terahertz frequencies", Laser Focus World (May 1993).
Oliner et al., "Radiating Elements and Mutual Coupling", Microwave Scanning Antennas, vol. 2, pp. 131-141, (1966).
Peerlings et al., "Long Resonator Micromachined Tunable GaAs-A1As Fabry-Perot Filter," IEEE Photonics Technology Letters, IEEE Service Center, Piscatawny, NJ, vol. 9, No. 9, Sep. 1997, pp. 1235-1237.
Raley et al., "A Fabry-Perot Microinterferometer for Visible Wavelengths", IEEE Solid-State Sensor and Actuator Workshop, Jun. 1992, Hilton Head, SC.

Schnakenberg, et al. TMAHW Etchants for Silicon Micromachining. 1991 International Conference on Solid State Sensors and Actuators-Digest of Technical Papers. pp. 815-818.
Science and Technology, The Economist, May 22, 1999, pp. 89-90.
Sperger et al., "High Performance Patterned All-Dielectric Interference Colour Filters for Display Applications", SID Digest, pp. 81-83, (1994).
Stone, "Radiation and Optics, An Introduction to the Classical Theory", McGraw-Hill, pp. 340-343, (1963).
Walker, et al., "Electron-beam-tunable Interference Filter Spatial Light Modulator", Optics Letters vol. 13, No. 5, pp. 345-347, (May 1988).
Williams, et al. Etch Rates for Micromachining Processing. Journal of Microelectromechanical Systems, vol. 5, No. 4, pp. 256-259, (Dec. 1996).
Winters, et al. The etching of silicon with XeF2 vapor. Applied Physics Letters, vol. 34, No. 1, pp. 70-73, (Jan. 1979).
Winton, John M., "A novel way to capture solar energy", Chemical Week, (May 1985).
Wu, "Design of a Reflective Color LCD Using Optical Interference Reflectors", ASIA Display '95, pp. 929-931, (Oct. 1995).
Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.
Zhou et al., "Waveguide Panel Display Using Electromechanical Spatial Modulators," SID Digest, vol. XXIX, 1998.
International Search Report and Written Opinion of the International Searching Authority for PCT/US2005/005919 dated Aug. 24, 2005.
International Search Report Application No. PCT/US2005/026448, Dated Nov. 23, 2005.
International Search Report Application No. PCT/US2005/029820, Dated Dec. 27, 2005.
International Search Report Application No. PCT/US2005/030962, Dated Aug. 31, 2005.
International Search Report Application No. PCT/US2005/034465, Dated Sep. 23, 2005.
European Search Report Application No. 05255693.3-2217, dated May 24, 2006.
European Search Report Application No. EP 05 25 5673 in 9 pages, dated Jan. 23, 2006.
Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.

* cited by examiner

| | | Column Output Signals | |
|---|---|---|---|
| | | $+V_{bias}$ | $-V_{bias}$ |
| Row Output Signals | 0 | Stable | Stable |
| | $+\Delta V$ | Relax | Actuate |
| | $-\Delta V$ | Actuate | Relax |

METHOD AND APPARATUS FOR LOW RANGE BIT DEPTH ENHANCEMENTS FOR MEMS DISPLAY ARCHITECTURES

BACKGROUND OF THE INVENTION

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In certain embodiments, a light modulator device comprises a first electrical conduit, a second electrical conduit electrically isolated from the first conduit, a first display element configured to communicate with the first conduit and the second conduit, and a second display element configured to communicate with the first conduit and the second conduit. The first display element is in an actuated state when a voltage difference between the first conduit and the second conduit has a magnitude greater than a first actuation voltage. The first display element is in a released state when the voltage difference between the first conduit and the second conduit has a magnitude less than a first release voltage. The second display element is in an actuated state when a voltage difference between the first conduit and the second conduit has a magnitude greater than a second actuation voltage. The second display element is in a released state when the voltage difference between the first conduit and the second conduit has a magnitude less than a second release voltage. Either the first actuation voltage is substantially equal to the second actuation voltage and the first release voltage is different from the second release voltage or the first actuation voltage is different from the second actuation voltage and the first release voltage is substantially equal to the second release voltage.

In certain embodiments, a light modulator device comprises a first means for conducting electrical signals, a second means for conducting electrical signals, and a first means for modulating light configured to communicate with the first conducting means and the second conducting means. The second conducting means is electrically isolated from the first conducting means. The first modulating means is in an actuated state when a voltage difference between the first conducting means and the second conducting means has a magnitude greater than a first actuation voltage. The first modulating means is in a released state when the voltage difference between the first conducting means and the second conducting means has a magnitude less than a first release voltage. The second modulating means is configured to communicate with the first conducting means and the second conducing means. The second modulating means is in an actuated state when a voltage difference between the first conducting means and the second conducting means has a magnitude greater than a second actuation voltage. The second modulating means is in a released state when the voltage difference between the first conducting means and the second conducting means has a magnitude less than a second release voltage. Either the first actuation voltage is substantially equal to the second actuation voltage and the first release voltage is different from the second release voltage or the first actuation voltage is different from the second actuation voltage and the first release voltage is substantially equal to the second release voltage.

In certain embodiments, a method of modulating light comprises providing a first display element configured to communicate with a first conduit and a second conduit, providing a second display element configured to communicate with the first conduit and the second conduit, and selectively applying voltages to the first and second conduits to selectively actuate and release the first display element and the second display element. The first display element is in an actuated state when a voltage difference between the first conduit and the second conduit has a magnitude greater than a first actuation voltage. The first display element is in a released state when the voltage difference between the first conduit and the second conduit has a magnitude less than a first release voltage. The second display element is in an actuated state when a voltage difference between the first conduit and the second conduit has a magnitude greater than a second actuation voltage. The second display element is in a released state when the voltage difference between the first conduit and the second conduit has a magnitude less than a second release voltage. Either the first actuation voltage is substantially equal to the second actuation voltage and the first release voltage is different from the second release voltage or the first actuation voltage is different from the second actuation voltage and the first release voltage is substantially equal to the second release voltage.

In certain embodiments, a method of displaying images comprises providing a plurality of pixels, selectively actuating the display elements of a pixel to provide a first bit density for a first range of intensities of the pixel, and selectively actuating the display elements of the pixel to provide a second bit density for a second range of intensities of the pixel. Each pixel comprises a plurality of display elements. The second range of intensities is higher than the first range of intensities. The second bit density is less than the first bit density.

In certain embodiments, a method of manufacturing a light modulator device comprises forming a first electrical conduit, forming a second electrical conduit electrically isolated from the first conduit, forming a first display element configured to communicate with the first conduit and the second conduit, and forming a second display element configured to communicate with the first conduit and the second conduit. The first display element is in an actuated state when a voltage difference between the first conduit and the second conduit has a magnitude greater than a first actuation voltage. The first display element is in a released state when the voltage difference between the first conduit and the second conduit has a magnitude less than a first release voltage. The second display element is in an actuated state when a voltage difference between the first conduit and the second conduit has a magnitude greater than a second actuation voltage. The second display element is in a released state when the voltage difference between the first conduit and the second conduit has a magnitude less than a second release voltage. Either the first actuation voltage is substantially equal to the second actuation voltage and the first release voltage is different from the second release voltage or the first actuation voltage is different from the second actuation voltage and the first release voltage is substantially equal to the second release voltage.

DETAILED DESCRIPTION OF THE PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

A set of display elements is provided that either have actuation voltages that are substantially equal and release voltages that are different or have release voltages that are substantially equal and actuation voltages that are different. Operation using these hysteresis windows allows for a decrease in the number of electrical conduits because the display elements may share common row and column drivers. In some embodiments, the optical active areas of the display elements are weighted to provide enhanced low range bit depth. In some embodiments, the ratio of the optically active areas of the display elements is 3, 7, 15, 31, 127, or 255.

Figure 1:
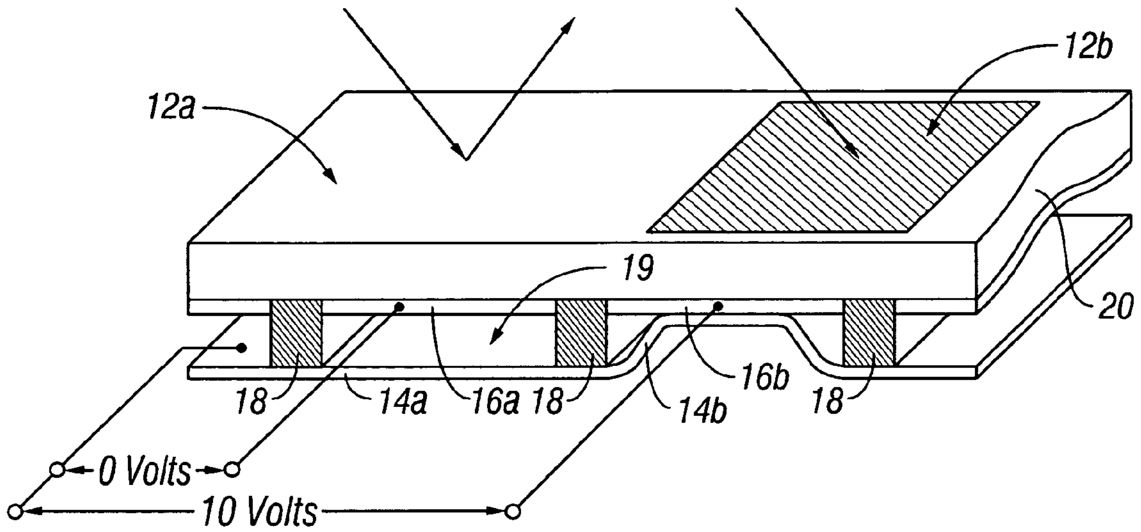
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel. The depicted portion of the pixel array in FIG. 1 includes two adjacent interferometric modulators 12*a* and 12*b* . In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b*.

The optical stacks 16*a* and 16*b* (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
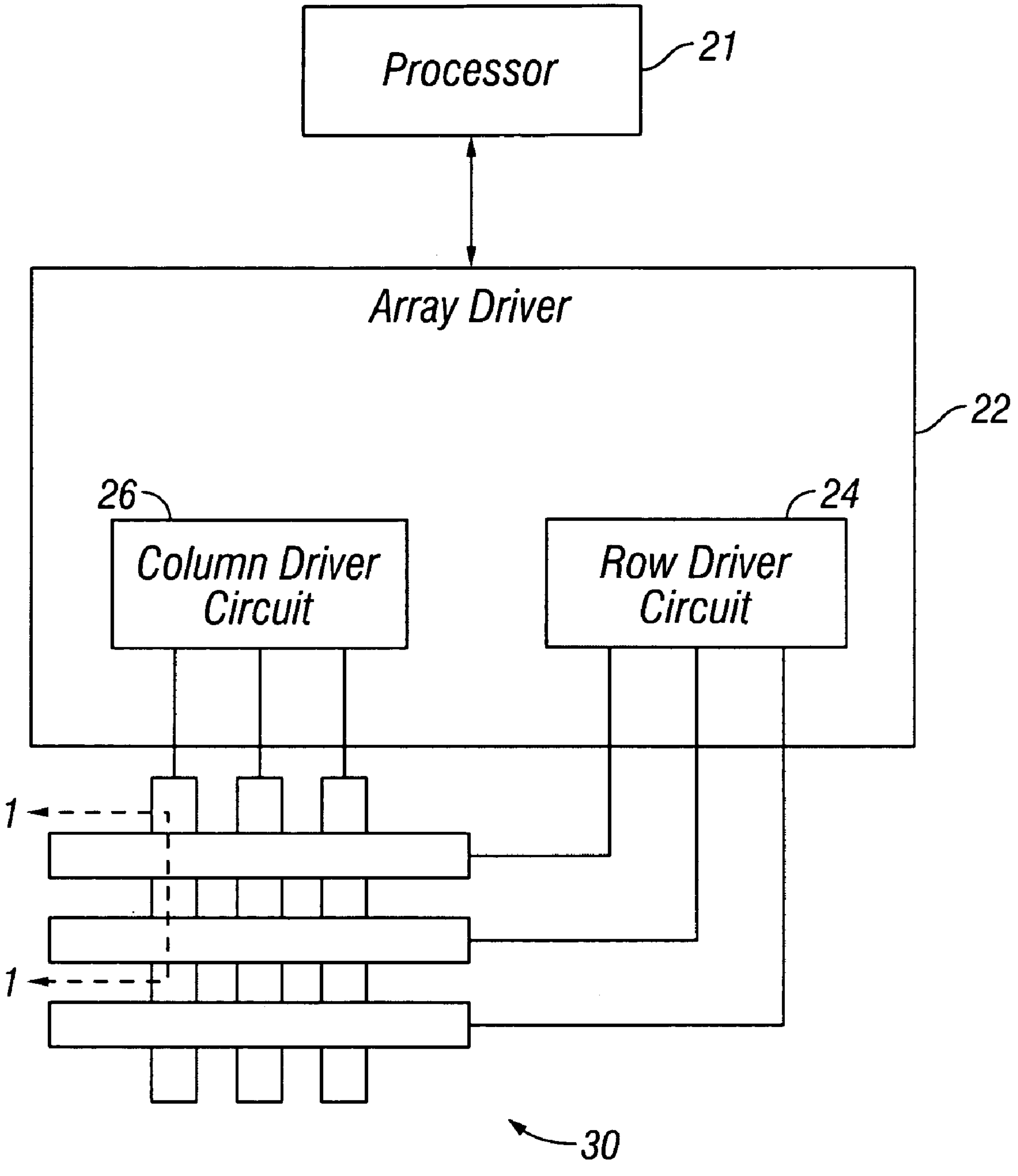
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
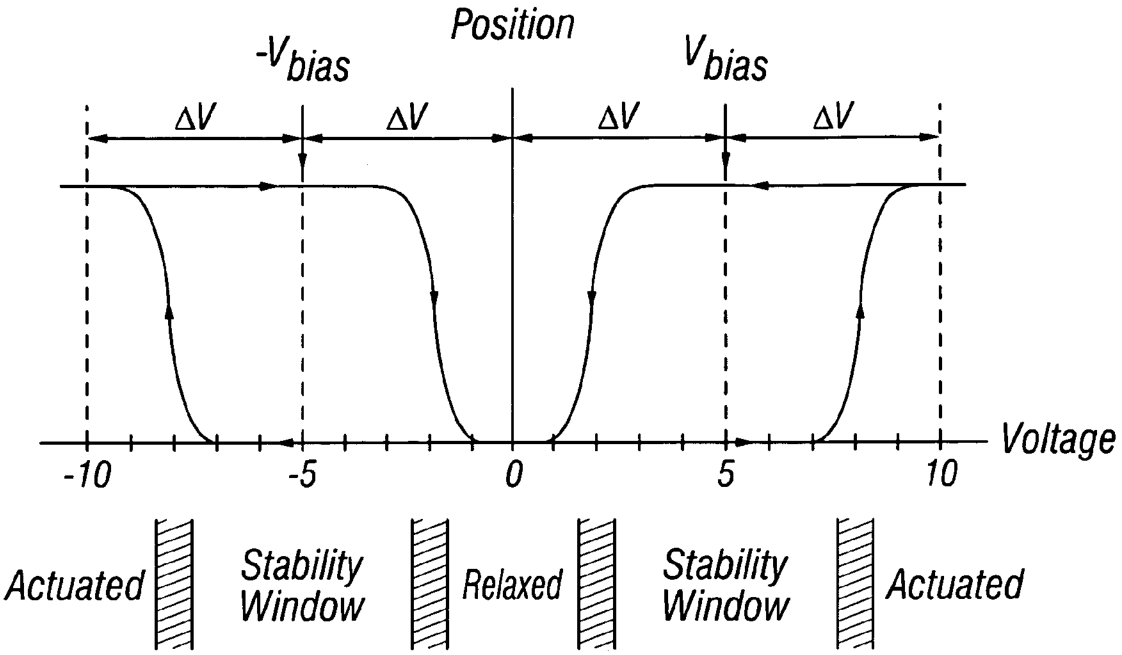
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
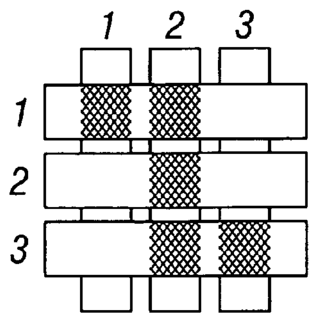
FIG. 5A illustrates one exemplary frame of display data in the 3×3 interferometric modulator display of FIG. 2.
Figure 5B:
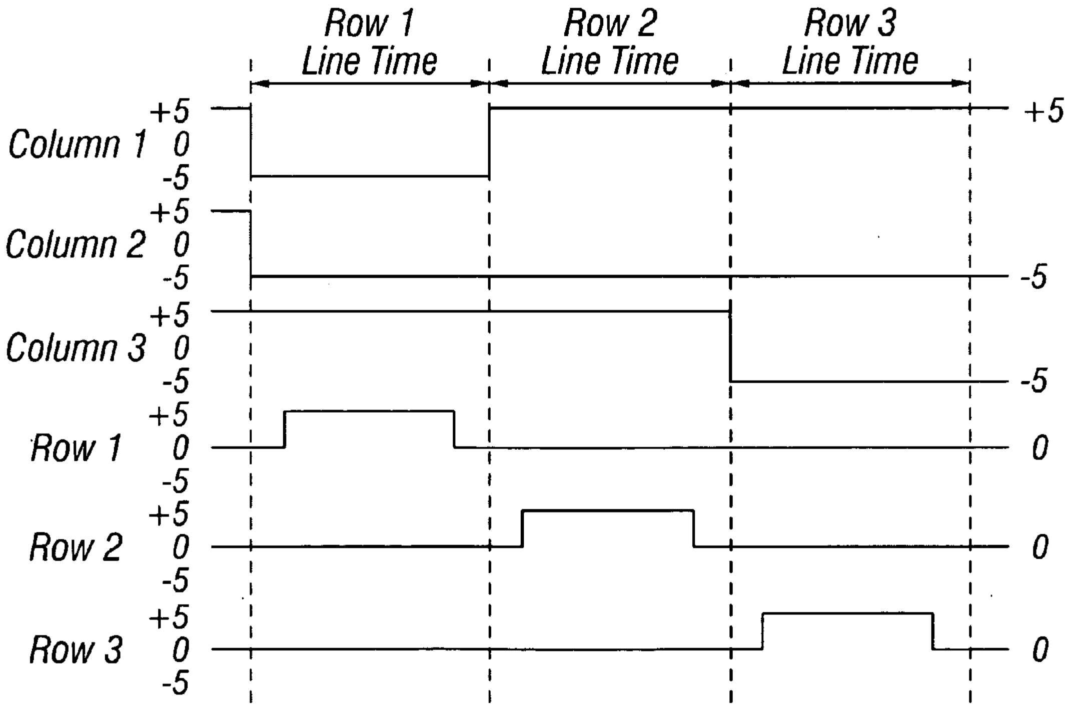
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
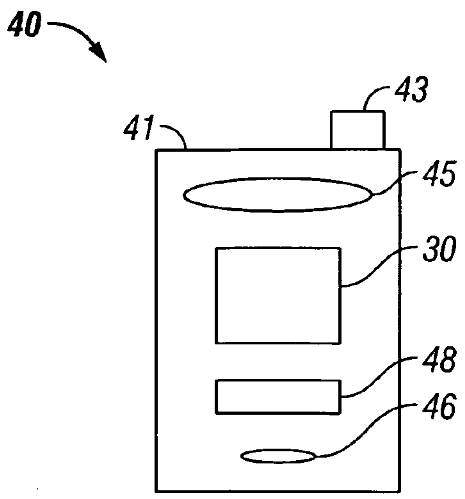
FIGS. 6A and 6B are system block diagrams illustrating an embodiment of a visual display device comprising a plurality of interferometric modulators.
Figure 6B:
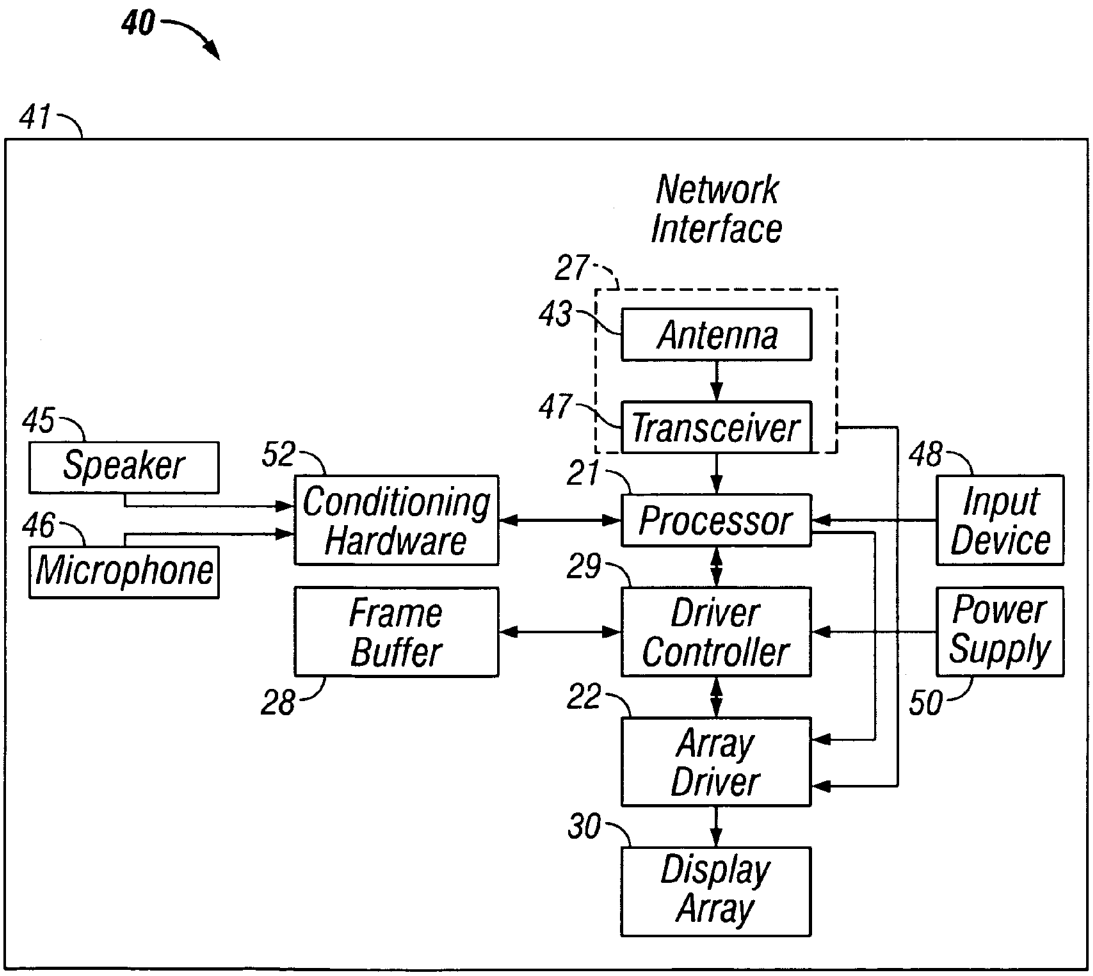

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disk drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
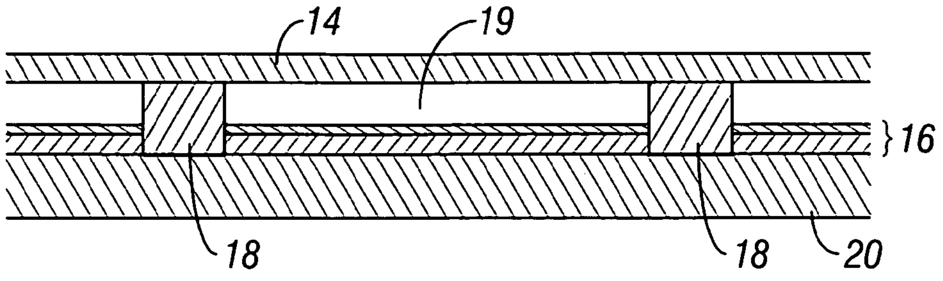
FIG. 7A is a cross section of the device of FIG. 1.
Figure 7B:
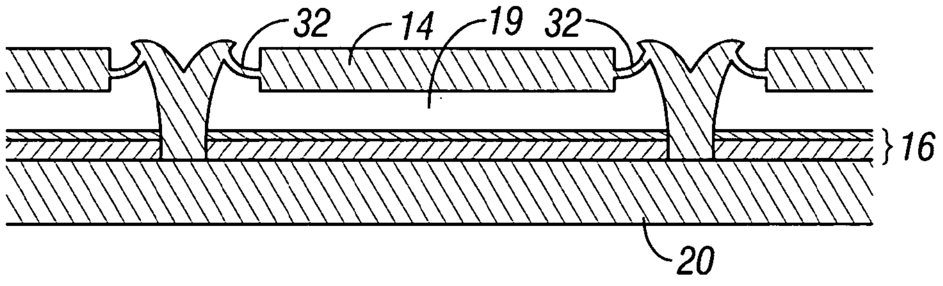
FIG. 7B is a cross section of an alternative embodiment of an interferometric modulator.
Figure 7C:
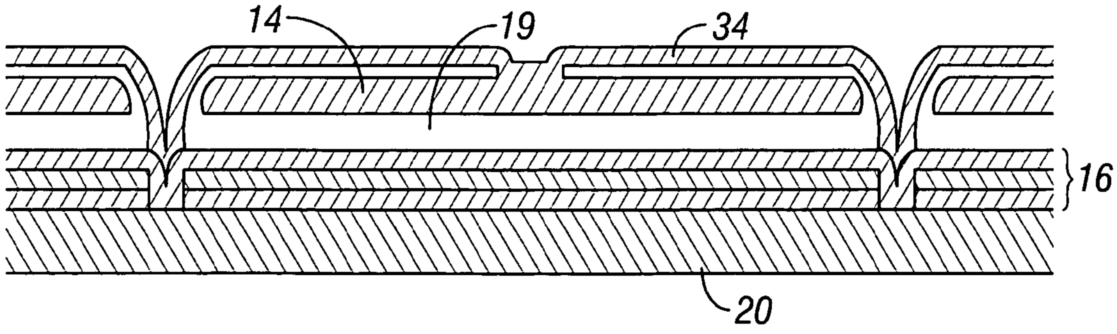
FIG. 7C is a cross section of another alternative embodiment of an interferometric modulator.
Figure 7D:
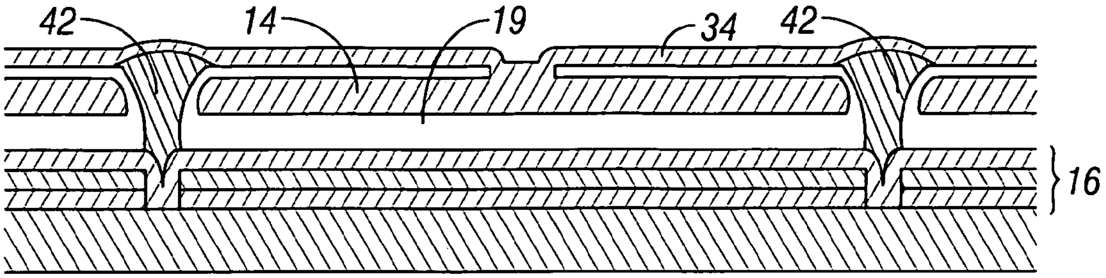
FIG. 7D is a cross section of yet another alternative embodiment of an interferometric modulator.
Figure 7E:
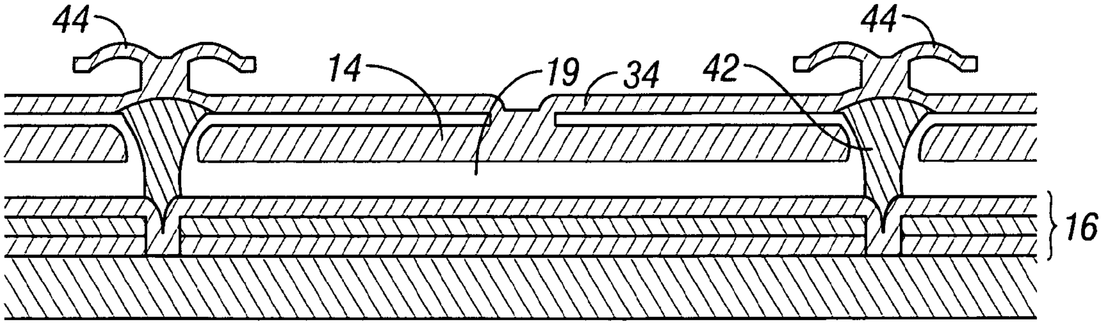
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
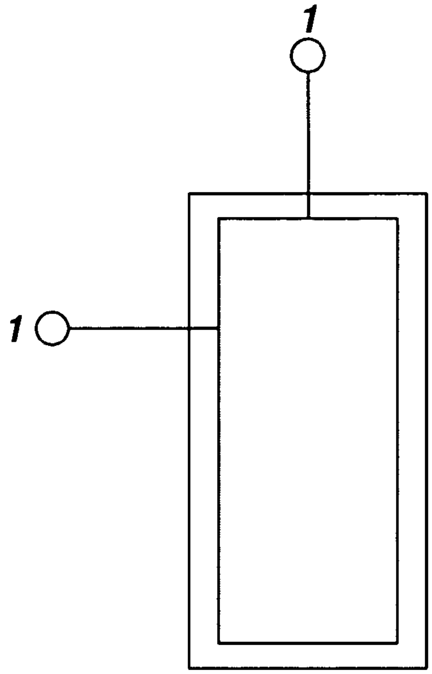
FIG. 8 is a schematic diagram of an embodiment of a monochrome interferometric modulator.
Figure 9:
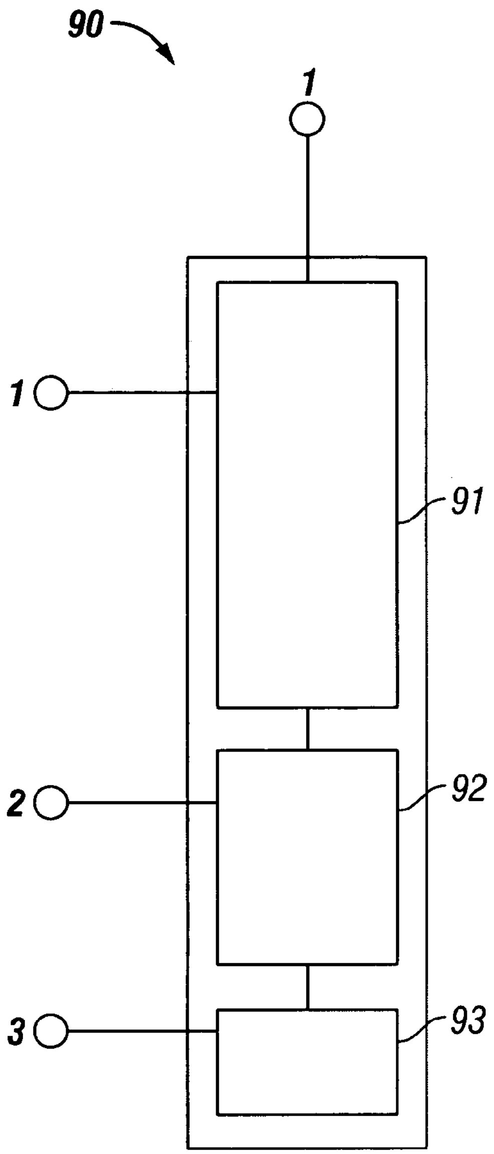
FIG. 9 is a schematic diagram of an embodiment of a grayscale interferometric modulator.

FIG. 8 illustrates one embodiment of a monochrome display including one interferometric modulator per pixel, the "on" or "off" state of the modulator being set based on the value of the one bit of data per pixel. The pixel is configured to communicate with one column conduit and one row conduit. A grayscale image may include several bits of data per pixel. For example, a "3-bit" grayscale display includes three bits of data per pixel that correspond to one of eight ($2^3$) shades of gray that may be assigned to each pixel. The pixel is configured to communicate with one column conduit and three row conduits. FIG. 9 illustrates an exemplary embodiment of a display for displaying a 3-bit grayscale image including three interferometric modulators 91, 92, 93 for each pixel 90. To obtain the eight shades, the three modulators 91, 92, 93 reflect light according to a varying size ratio. In one such embodiment, each of the interferometric modulators 91, 92, 93 includes mirrors having a reflective surface area that varies according to the ratio of 4:2:1. The reflective portion of one mirror or modulator may be referred to as "subtending" a portion of the pixel. For example, the mirror with a surface area of one in the 4:2:1 embodiment subtends about 1/7 of the pixel. A particular shade in a pixel is obtained by setting each modulator to an "on" or "off" state based on the binary value of a corresponding bit of the three bits of data.

Figure 10:
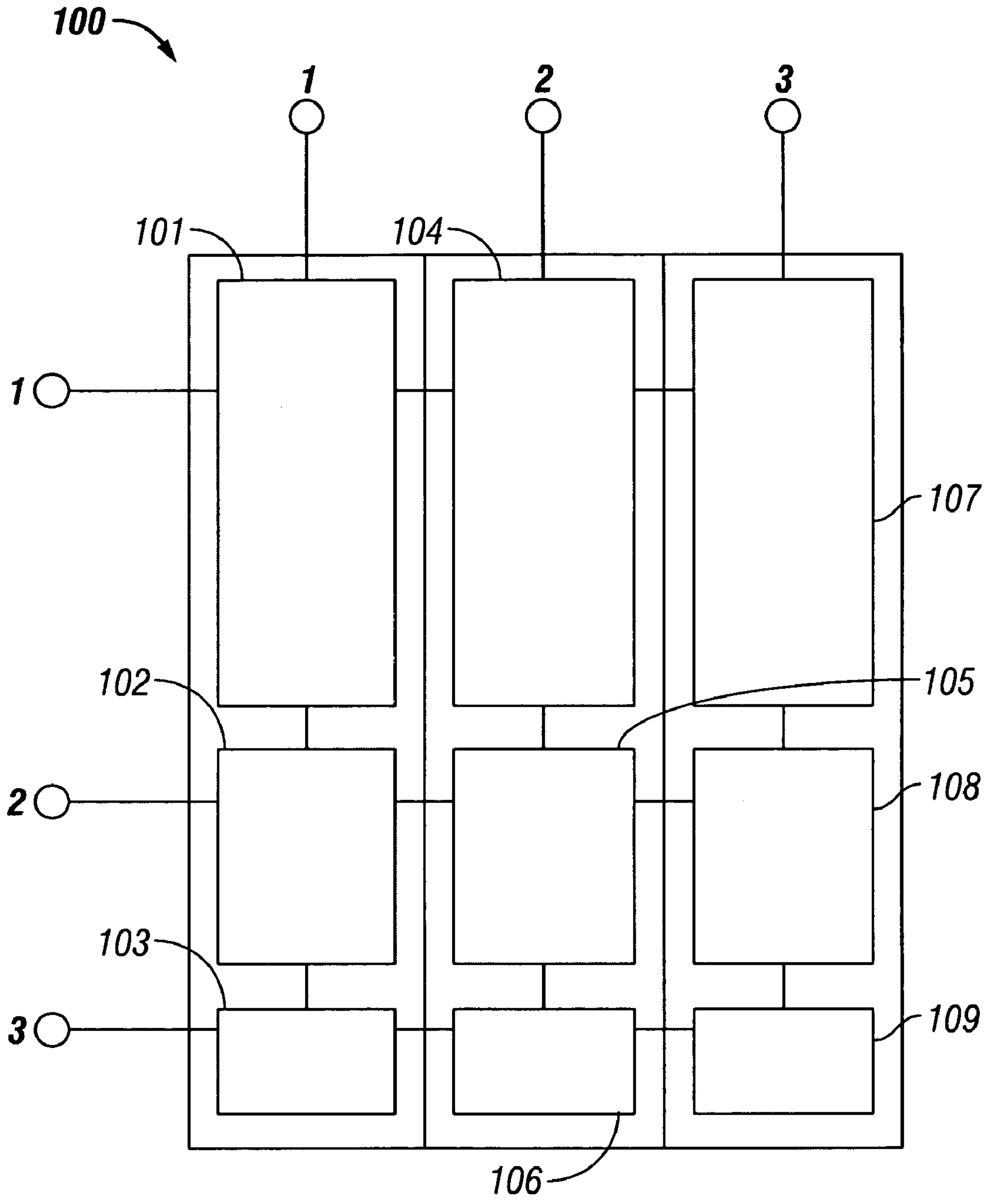
FIG. 10 is a schematic diagram of an embodiment of a color interferometric modulator.

FIG. 10 illustrates one embodiment of a color display having pixel 100 that works similarly to the grayscale pixel 90 of FIG. 9, except that the pixel 100 includes a group of red interferometric modulators 101, 102, 103, green interferometric modulators 104, 105, 106, and blue interferometric modulators 107, 108, 109. For example, the pixel 100 is responsive to a 9-bit signal in which three groups of 3 bits each correspond to the three colors. As another example, in a 12-bit color display, four of the twelve bits correspond to each of sixteen intensities of red, green, and blue that are produced by red, green, or blue interferometric modulators.

Figure 11:
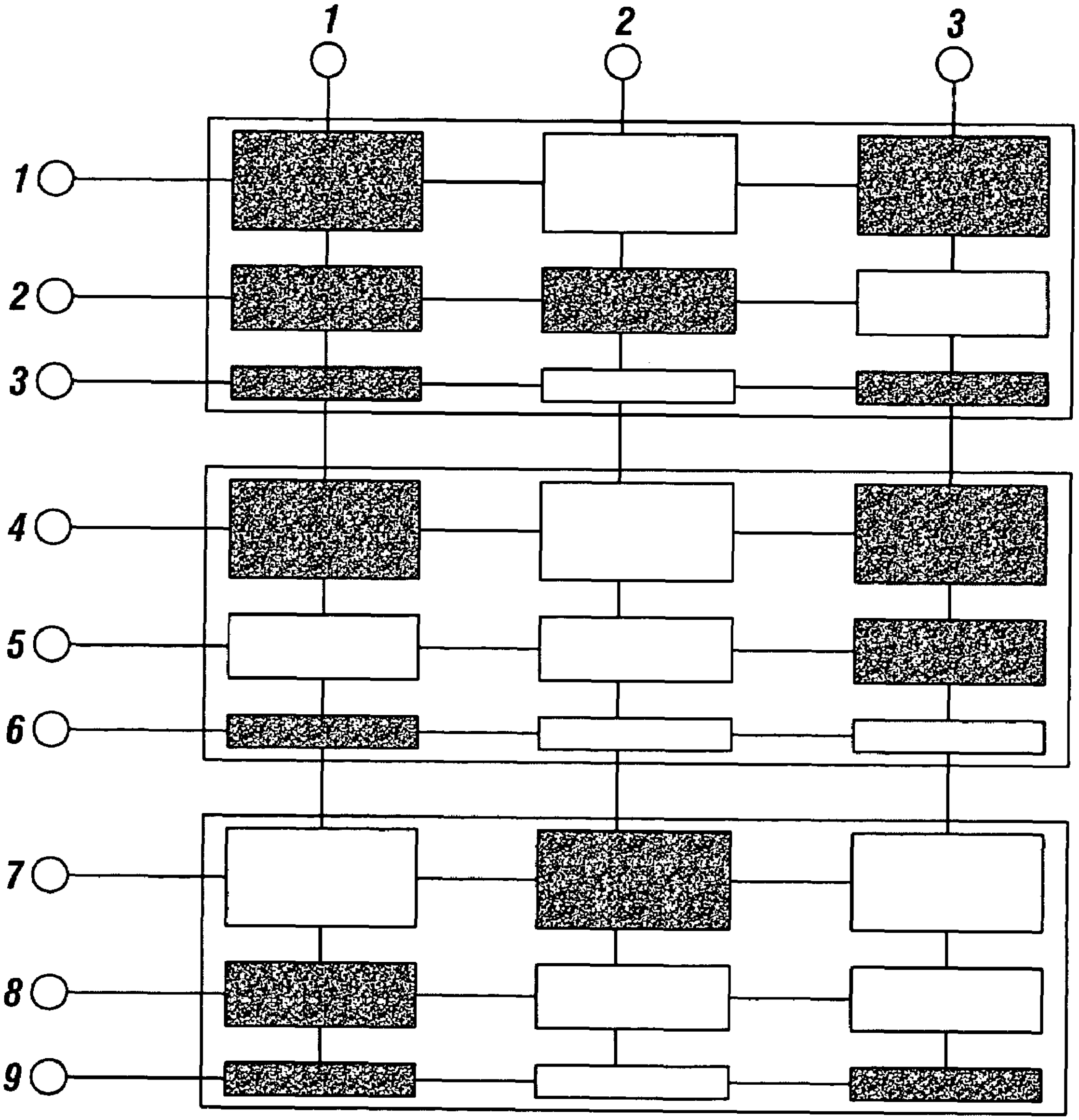
FIG. 11 is a schematic diagram of an embodiment of an interferometric modulator in which the rows have been subdivided into three subrows.

Such grayscale or color displays have more display elements to address than does a monochrome display. In order to address these display elements for such embodiments of gray or color displays, the number of conduits (or "driver connections" or "addressing lines" or "leads") to the display control typically increases. For example, FIG. 11 illustrates one embodiment of a 3-bit grayscale display in which the pixels are in a 3×3 configuration with each of the three rows subdivided into three subrows of modulators. Such an embodiment has nine row driver connections and three column driver connections for a total of twelve driver connections rather than the six driver connections used for a 3×3 monochrome display. One way of reducing the number of driver connections is to configure a group of modulators to communicate with a single row conduit, for example (as depicted in FIG. 12), the three subrows in the 3-bit grayscale embodiment discussed above, and drive the group with a signal that changes the state of a selected subset of the group.

Figure 13:
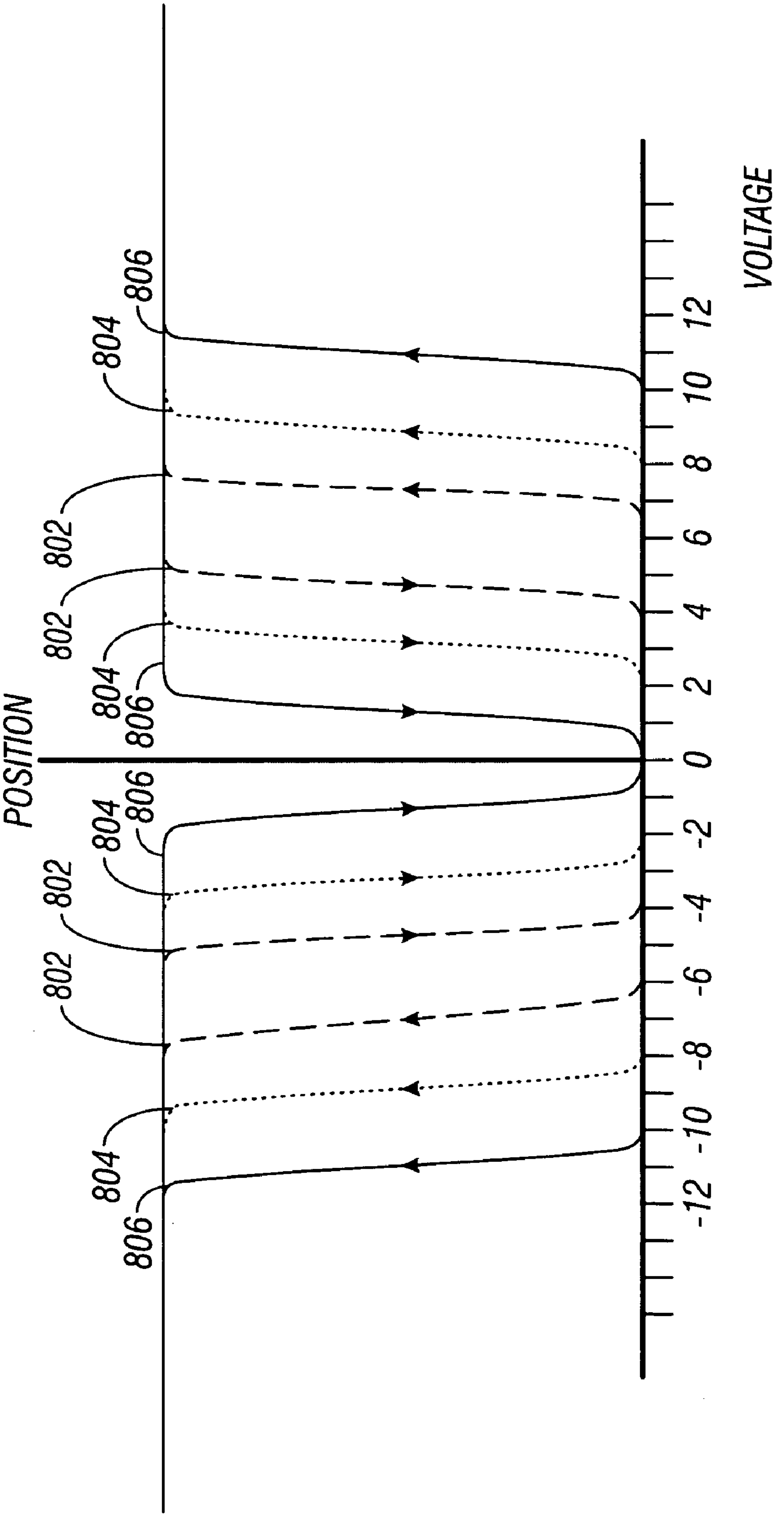
FIG. 13 is a diagram of movable mirror position versus applied positive and negative voltage illustrating one exemplary embodiment of three interferometric modulators that have nested stability windows.

In certain embodiments, the interferometric modulators of each of the subrows may have varying actuation and release voltages so as to enable a group of subrows that are configured to communicate with a single row conduit to be individually addressed. FIG. 13 is a diagram of movable mirror position versus applied positive and negative voltage illustrating one exemplary embodiment of three interferometric modulators that have nested stability windows. As used herein, the term "nested" is to mean with exploitable differences in both actuation voltages and release voltages. The innermost nested hysteresis window, indicated by the traces 802, has actuation and release voltages having magnitudes of 8 volts and 4 volts, respectively. This hysteresis window is nested in the hysteresis window indicated by traces 804 and is nested in the hysteresis window indicated by traces 806. The next nested hysteresis window, indicated by the traces 804, has actuation and release voltages having magnitudes of 10 volts and 2 volts, respectively. This hysteresis window is nested in the hysteresis window indicated by traces 806. The outermost hysteresis window, indicated by the traces 806, has actuation and release voltages having magnitudes of 12 volts and 0 volts, respectively.

The hysteresis window of the modulators associated with each subrow may be selected by varying the geometry and/or materials of the modulators. In particular, the width (difference between the actuation and release voltages), the location (the absolute values of the actuation and release voltages), and the relative values of the actuation and release voltages may be selected by varying geometric and material properties of the modulators. The varied properties may include, for example, the distance between movable mirror supports, the mass associated with the movable mirror relative to the spring constant, the thickness, tensile stress, or stiffness of the mirror and/or the layers or mechanism that moves the mirror, and the dielectric constant and/or thickness of a dielectric layer between the stationary electrode and the movable electrode. More details of the selection of the hysteresis properties of the interferometric modulators are disclosed in U.S. patent application Ser. No. 11/193,012, entitled "Method and Device for Selective Adjustment of Hysteresis Window," filed on Sep. 27, 2004, incorporated herein by reference in its entirety.

Figure 12:
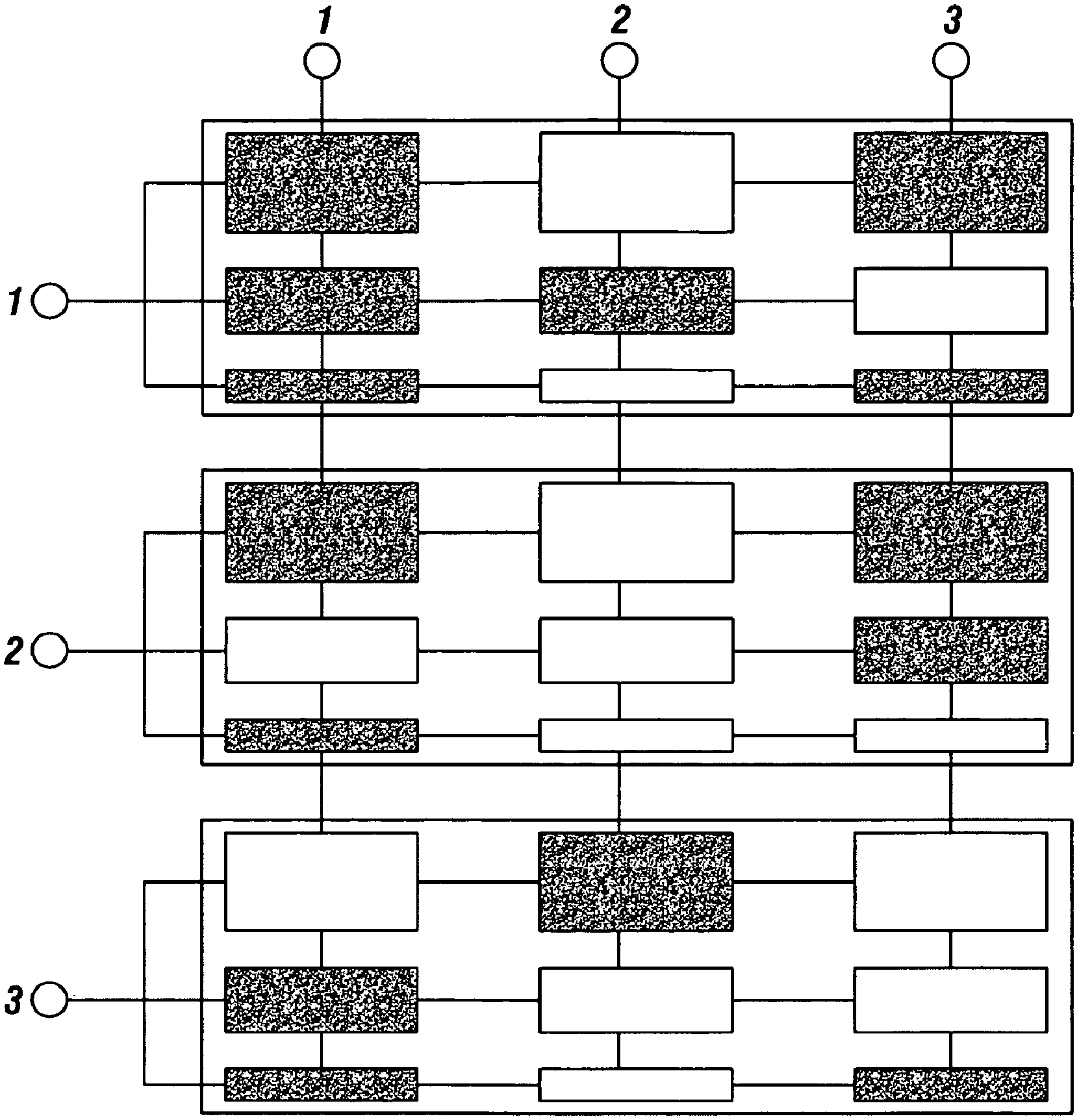
FIG. 12 is a schematic diagram of an embodiment of an interferometric modulator in which the rows have been subdivided into three subrows that are configured to communicate with a common row driver connection.
Figure 14:
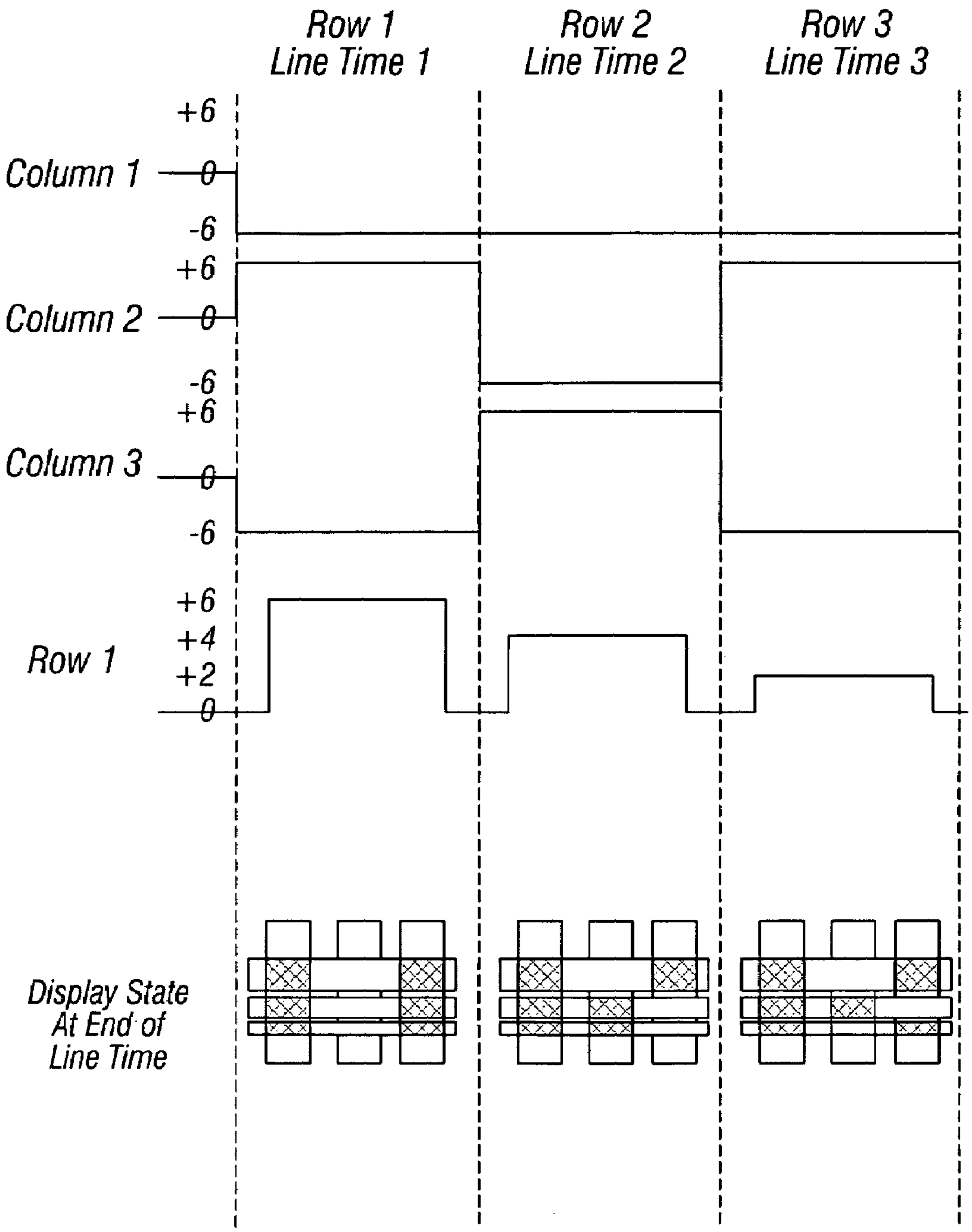
FIG. 14 is a timing diagram that illustrates a series of row and column signals applied to the top row of the embodiment of the array of FIG. 12 to produce the illustrated display arrangement.

In one embodiment in which the modulators of each of the subrows have hysteresis stability windows that are nested within each other, the interferometric modulators are arranged as in FIG. 12. In the illustrated embodiment, the stability windows are nested from outer to inner, such as the windows depicted in FIG. 13, from the top subrow to the bottom subrow. FIG. 14 is an exemplary timing diagram that illustrates a series of row and column signals applied to the top row (Row 1) of such an embodiment to produce the display arrangement illustrated in Row 1 of FIG. 12. In general, the positive voltage regime and the negative voltage regime are substantially equivalent to one another, as shown in FIG. 13. Although described and illustrated herein in terms of the positive voltage regime, in certain embodiments, the interferometric modulators can be similarly operated in the negative voltage regime. The row pulses decrease in magnitude from left to right, corresponding to the subrows from top to bottom. This decreasing magnitude of the pulses is selected to address only those modulators in subrows that have smaller actuation and greater release voltages. For example, in the illustrated embodiment, potentials of +6 and −6 volts are applied to the columns and row pulses of +6, +4, and +2 volts are applied to the rows.

The pulses of FIG. 14 set the state of Row 1 of the display to that depicted in FIG. 12 as follows. For the first line time for Row 1, Column 1, a Column 1 potential of −6 volts is applied along with a row pulse of +6 volts, producing a 12-volt difference across the modulators of Row 1, Column 1, to set the state of the modulators of each of the Row 1, Column 1 subrows in the actuated position as illustrated along the bottom of FIG. 14. The Column 1 potential remains at −6 for the remaining Row 1 line times to continue to set the state of each of the elements in the Row 1, Column 1 subrows to the actuated position. In Column 2, a Column 2 potential of +6 volts is applied in conjunction with the row pulse at +6 volts in the first line time, producing a zero-volt difference across the modulators of Row 1, Column 2, to release all modulators in the subrows in Row 1, Column 2. During the second line time for Row 1, a Column 2 potential of −6 volts is applied in conjunction with a row pulse of +4 volts, producing a 10-volt difference across the modulators of Row 1, Column 2, to actuate the bottom two subrows of Row 1, Column 2. During the third row time for Row 1, a Column 2 potential is applied at +6 volts in conjunction with a row pulse of +2 volts, producing a 4-volt difference across the modulators of Row 1, Column 2, to release the modulator in the bottom subrow of Row 1, Column 2. In Column 3, a Column 3 potential of −6 volts is applied in conjunction with the row pulse at +6 volts in the first line time, producing a 12-volt difference across the modulators of Row 1, Column 3, to actuate all modulators in the subrows in Row 1, Column 3. During the second line time for Row 1, a Column 3 potential of +6 volts is applied in conjunction with a row pulse of +4 volts, producing a 2-volt difference across the modulators of Row 1, Column 3, to release the bottom two subrows of Row 1, Column 3. During the third row time for Row 1, a Column 3 potential is applied at −6 volts in conjunction with the row pulse of +2 volts, producing an 8-volt difference across the modulators of Row 1, Column 3, to actuate the modulator in the bottom subrow of Row 1, Column 3.

Figure 15:
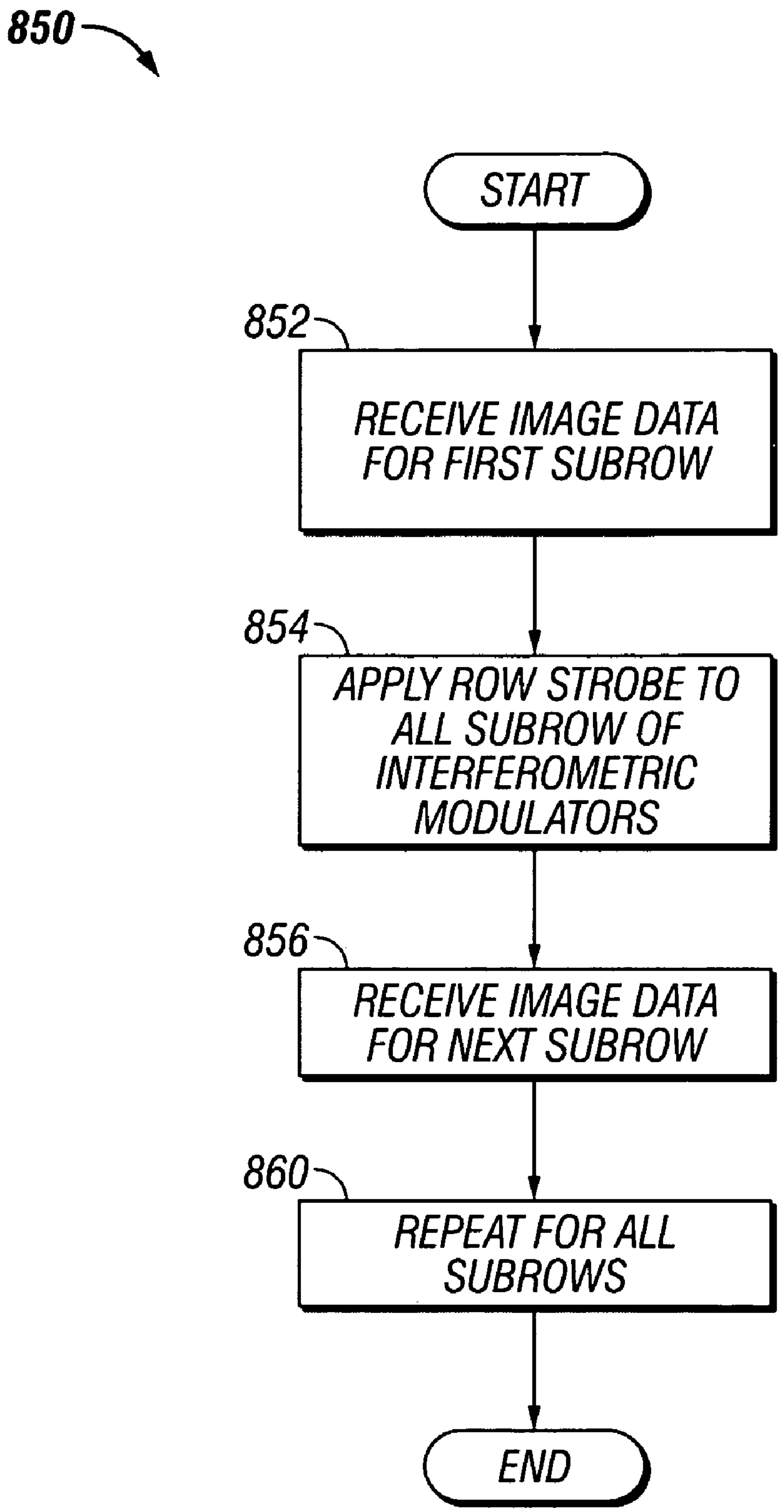
FIG. 15 is a flowchart illustrating one embodiment of a method of driving an interferometic modulator array.

FIG. 15 is a flowchart illustrating one embodiment of a method 850 of updating an embodiment of a display such as depicted in FIG. 12. The method 850 begins at a block 852 in which the driver 22 of FIG. 2 receives image data value for a subrow. In one embodiment, the driver 22 receives the data value from a frame buffer. Next, at a block 854, the driver 22 applies a row strobe to all subrows of interferometric modulators along with a column potential that corresponds to the image data value. Moving to block 856, the driver 22 receives the data for the next subrow. Next, at block 860, the acts of blocks 854 and 856 are repeated for each of the subrows. In one embodiment, the acts of the blocks 854 and 856 occur at least partially concurrently.

At least one aspect of the present invention is the realization that quantization artifacts are more visible to the user in low-intensity regions than in high-intensity regions because the percentage change between quantization levels is greater at lower intensities. For example, in a 7-bit ($2^7$=128 quantization levels) system, the intensity change from level 100 to level 101 is 1%. Most users cannot discern intensity changes below about 4%, so transitions at or below this quantization level appear smooth. However, the change from level 10 to level 11 is 10%, an intensity change that is easily seen by most users. Therefore, at low intensity quantization levels, the quantization of analog data into discrete digitized quantization steps is clearly seen as an artifact. The most straightforward approach to this problem is to digitize at higher bit densities. For example, instead of being digitized to 7 bits across the intensity range, the given signal is digitized to 10 bits ($2^{10}$=1,024 quantization levels) across the intensity range so that the analog quantization levels that would have fallen around level 10 in the 128-level configuration fall around level 80 in the 1,024 level configuration. The transition from level 80 to level 81 is about 1.2%, and would then be indiscernible to the user. However, such increases in system bit density can lead to greater system complexity and cost (e.g., the number of driver connections would increase by about 38% from 24 in a 3×3 7-bit grayscale display to 33 in a 3×3 10-bit grayscale display).

In interferometric modulator-based systems, these complexity issues tend to impact the cost and complexity of driver integrated circuits and the cost and complexity of the systems themselves. Several drive scheme methods for complex interferometric modulator displays have been disclosed that reduced driver complexity and cost at the expense of imposing even further operational limitations and tighter manufacturing tolerances on the interferometric modulator systems. Many of these drive schemes also involve adding additional addressing cycles to the interferometric modulator. These additional cycles tend to reduce the maximum frame height and rate capability of the interferometric modulator or require further technology development of the interferometric modulator in order to maintain the frame rate of previous levels. Many of these solutions and improvements are overkill in the sense that they decrease the quantization step size throughout the entire range of the digitized signal, even though there is no need to decrease the step size at the high-intensity end of the signal range (e.g., at least above the quantization steps from about 30 to 31, which is only 3.3%).

Figure 16:
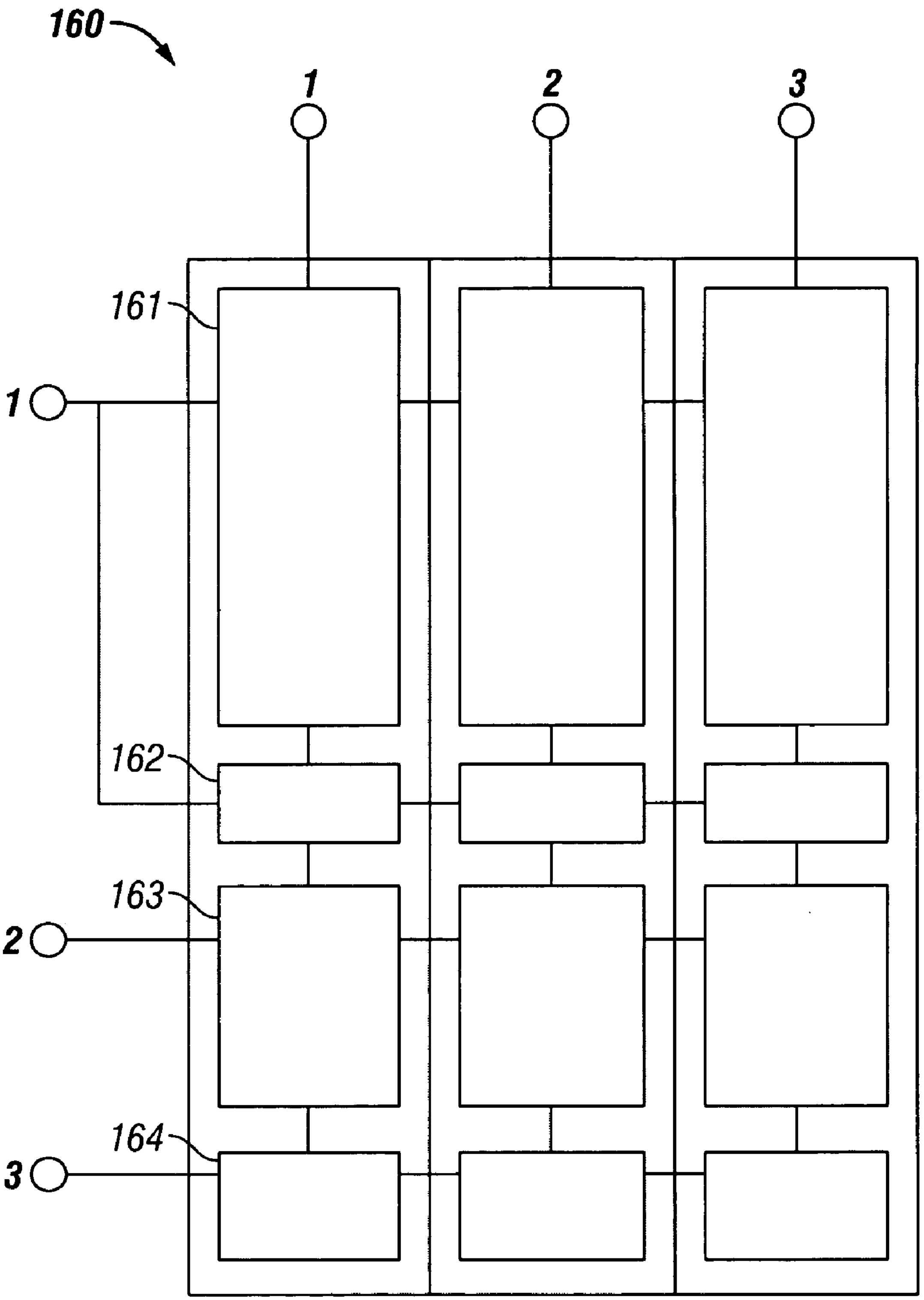
FIG. 16 is a schematic diagram of an embodiment of the interferometric modulator in which the rows have been subdivided into four subrows and in which two subrows are configured to communicate with a common row driver connection.

FIG. 16 is a schematic diagram of an embodiment of a color interferometric modulator pixel 160. In the embodiment illustrated in FIG. 16, the interferometric modulator 101 of FIG. 10 has been partitioned or replaced by two interferometric modulators 161, 162 (or "display elements") arranged in two subrows that are configured to communicate with a common row conduit. In FIG. 10, the modulator 101 subtends about 4/7 of the area of the first column. When partitioned as in FIG. 16, the modulator 161 subtends about half (7/14) of the first column and the modulator 162 subtends about 1/14 of the first column. The first display element 161 has a first optically active area and the second display element 162 has a second optically active area. In certain embodiments, the ratio of the first optically active area to the second optically active area is approximately equal to an integer to one (e.g., 7 to 1, 7:1, 7/1). In some embodiments, the integer is 2, 3, 4, 5, 6, 7, 8, 9, or 10. In some embodiments, the integer is 3, 7, 15, 31, 63, 127, 255, or any number $2^n$-1 where n is an integer greater than or equal to 2.

J When both of the modulators 161, 162 are driven together, the function of the pixel 160 is unchanged from the pixel 100 schematically depicted in FIG. 10. Although FIG. 16 represents an embodiment partitioning the modulators 101, 104, and 107 in FIG. 10, such partitioning may also be appropriate for grayscale displays (e.g., by partitioning the modulator 91 depicted in FIG. 9).

As used herein, the terms "divided," "partitioned," and "replaced" in relation to the plurality of interferometric modulators or mirrors of various embodiments does not require that a larger interferometric modulator or mirror actually be created and then partitioned into smaller interferometric modulators or mirrors. Instead, the terms are used to compare the relative structures from previously described configurations. For example, the modulators 161 and 162 in FIG. 16 are typically formed independently from one another, as opposed to having been formed as a single modulator 101 as depicted in FIG. 10 and then partitioned into smaller modulators. Moreover, independent creation is preferable in some embodiments to allow for individual adjustment of the hysteresis curves for the modulators 161, 162 as described above.

Figure 17:
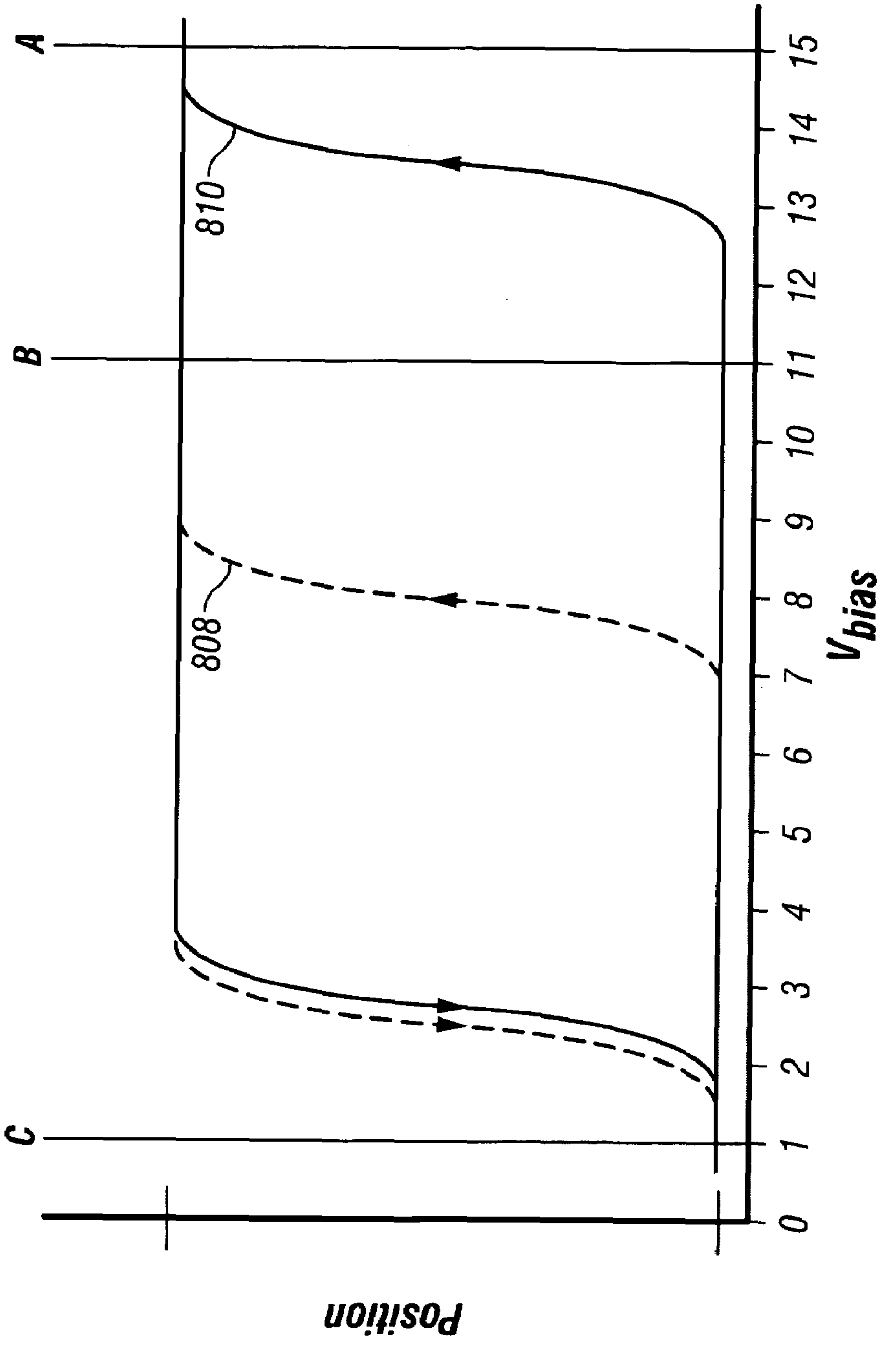
FIG. 17 is a diagram of movable mirror position versus applied positive voltage illustrating one exemplary embodiment of two interferometric modulators that have different stability windows in which the release voltages are about the same but the actuation voltages are different.

FIG. 17 is a diagram of modulator position versus applied positive voltage illustrating one exemplary embodiment of two interferometric modulators (e.g., the two modulators 161, 162 illustrated in FIG. 16) that have hysteresis curve stability windows in which the actuation voltages are different, but the release voltages are about the same. The traces 810 represent the hysteresis loop of the modulator 161 and the traces 808 represent the hysteresis loop of the modulator 162. In certain embodiments, the release voltages of the two modulators 161, 162 are considered to be substantially equal to one another when any differences between the respective release voltages are not used to selectively release one of the modulators and not the other. The hysteresis loop depicted by the traces 808 has an actuation voltage of about 9 volts and a release voltage of about 1 volt. The hysteresis loop represented by the traces 810 has an actuation voltage of about 15 volts and has a release voltage of about 1 volt. Because the release voltages of the hysteresis loops of FIG. 17 are not exploitably different from each other (i.e., there are no voltages that can be applied to reliably release one modulator and not the other modulator), the hysteresis loops of FIG. 17 cannot be said to be "nested" as defined herein.

Figure 18:
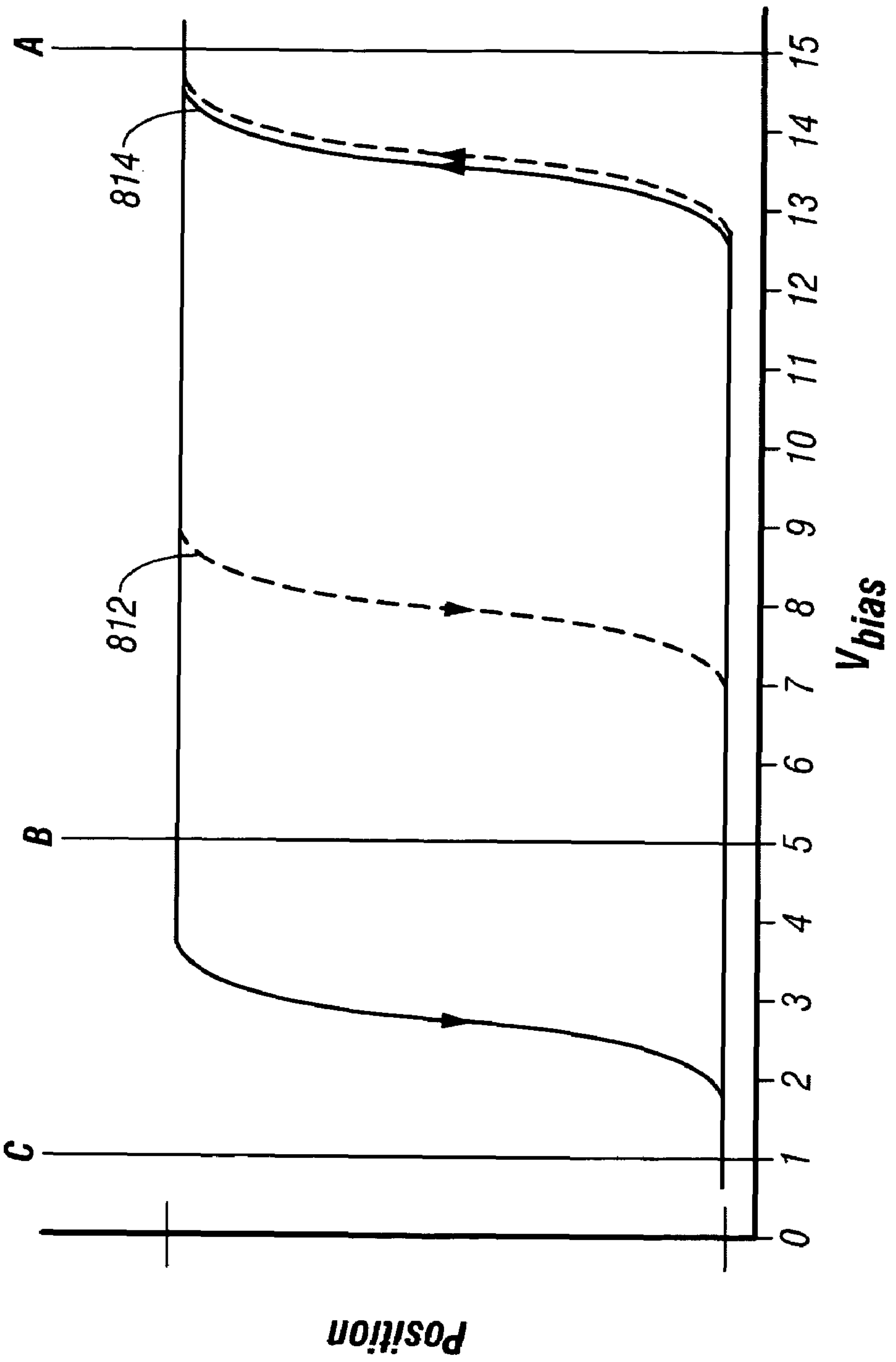
FIG. 18 is a diagram of movable mirror position versus applied positive voltage illustrating one exemplary embodiment of two interferometric modulators that have different stability windows in which the release voltages are different but the actuation voltages are about the same.

FIG. 18 is a diagram of modulator position versus applied positive voltage illustrating another exemplary embodiment of two interferometric modulators (e.g., the two modulators 161, 162 illustrated in FIG. 16) that have different stability windows in which the release voltages are different, but the actuation voltages are about the same. The traces 814 represent the hysteresis loop of the modulator 161 and the traces 812 represent the hysteresis loop of the modulator 162. In certain embodiments, the actuation voltages of the two modulators 161, 162 are considered to be substantially equal to one another when any differences between the respective actuation voltages are not used to selectively actuate one of the modulators and not the other modulator. The hysteresis loop depicted by the traces 812 has an actuation voltage of about 15 volts and a release voltage of about 6 volts. The hysteresis loop represented by the traces 814 has an actuation voltage of about 15 volts, but has a release voltage of about 1 volt. Because the actuation voltages of the hysteresis loops of FIG. 18 are not exploitably different from each other (i.e., there are no voltages that can be applied to reliably actuate one modulator and not the other modulator), these hysteresis loops cannot be said to be "nested" as defined herein.

Unlike the embodiment described above in which nested hysteresis windows are intended to be used to both selectively actuate and selectively release the modulators at different voltages, the exemplary embodiments depicted in FIGS. 16-18 provide additional manufacturing advantages. The actuation voltages and release voltages of each of the nested hysteresis loops of FIG. 13 are proximate to each other. For example, the release voltage for the loop 804 is about 2 volts and the release voltage for the loop 802 is about 4 volts. Thus, in order to selectively release the modulator represented by loop 802, but to selectively not release the modulator represented by loop 804, the voltage applied would be between 2 and 4 volts, preferably around 3 volts. This voltage accuracy can present problems if the manufacturing tolerances of the modulators that release at 2 volts and 4 volts are not sufficiently precise. For example, if the modulator represented by loop 802 was manufactured such that its release voltage was 3.5 volts and the modulator represented by loop 804 was manufactured such that its release voltage was 2.5 volts, the tolerance window for the applied voltage would shrink considerably. The applied voltage may also vary with manufacturing tolerances such that an application of 3 volts to the modulator may actually result in a voltage difference across the modulator closer to 2.5 volts. Thus, a voltage applied to the modulators to release the modulator represented by loop 802 may inadvertently also release the modulator represented by loop 804. The manufacturing tolerances for each of the three subrows represented in FIG. 13 would need to be highly accurate as there are six precise actuation and release voltages that would need to be achieved in order to accurately differentially actuate and release each of the three modulators. By contrast, the two modulators represented by the hysteresis loops in FIG. 17 or FIG. 18 require only three voltages, represented by lines A, B, and C, to differentially actuate and release the two modulators. Additionally, because the size differential between the modulator 161 and the modulator 162 is large, the voltages for actuation and/or release can advantageously be less precise than the voltages for the configuration depicted in FIG. 13.

Figure 19:
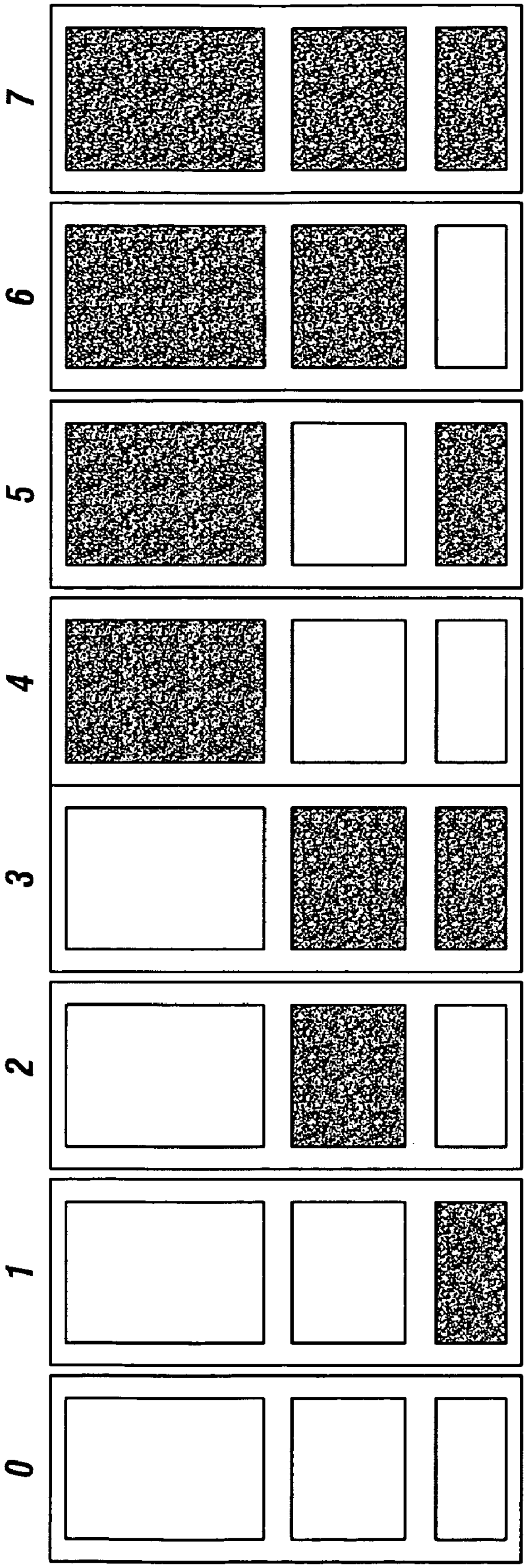
FIG. 19 schematically illustrates the quantization steps and quantization levels provided by the schematic of FIG. 10.
Figure 20:
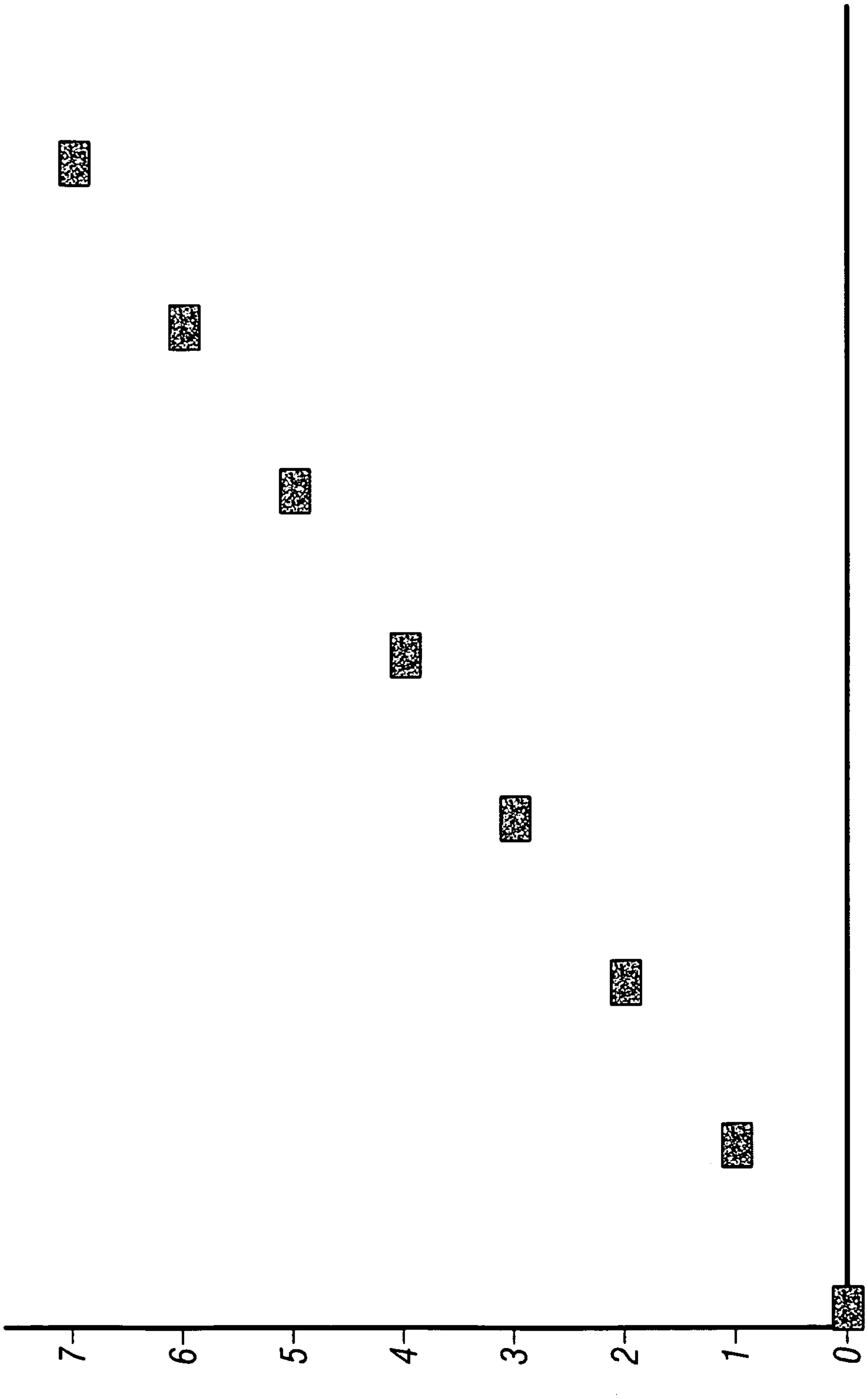
FIG. 20 is a chart illustrating the quantization steps and quantization levels provided by the schematic of FIG. 10.

FIG. 19 schematically illustrates the quantization levels provided by the schematic of FIG. 10. None of the modulators are in the "on" state in level 0 and all of the modulators are in the "on" state in level 7. Some of the modulators are in the "on" state in levels 1 through 6, providing varying amounts of intensity. The bit density at low intensity ranges is the same as the bit density at high intensity ranges. For example, as shown in FIG. 20 for the pixel 100 of FIG. 10, the intensity difference between sequential quantization steps for intensities below level 4 (e.g., intensity difference of one) is the same as the intensity difference between sequential quantization steps for intensities above level 4 (e.g., intensity difference of one).

Figure 21:
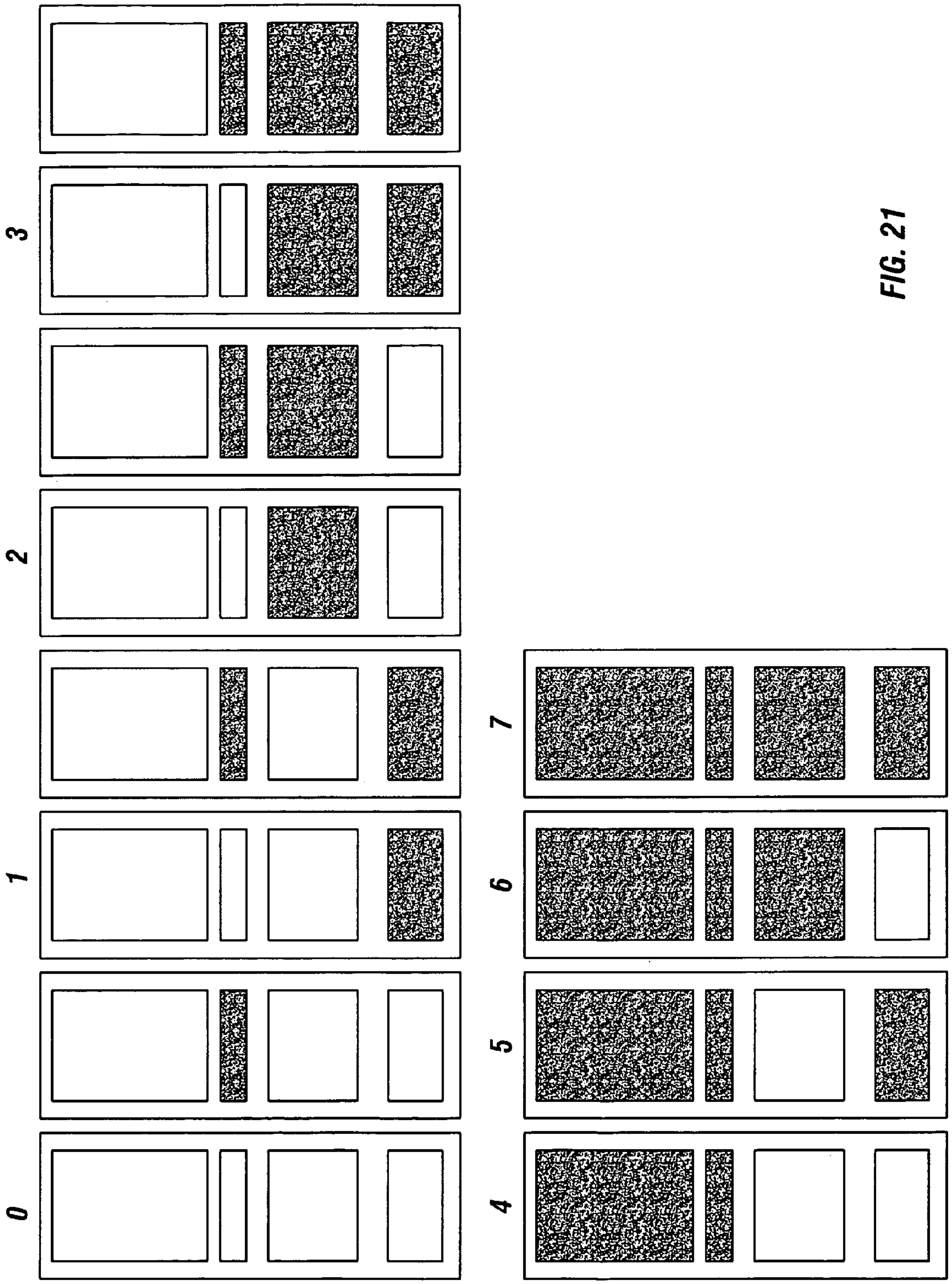
FIG. 21 schematically illustrates the quantization steps and quantization levels provided by the schematic of FIG. 16.
Figure 22:
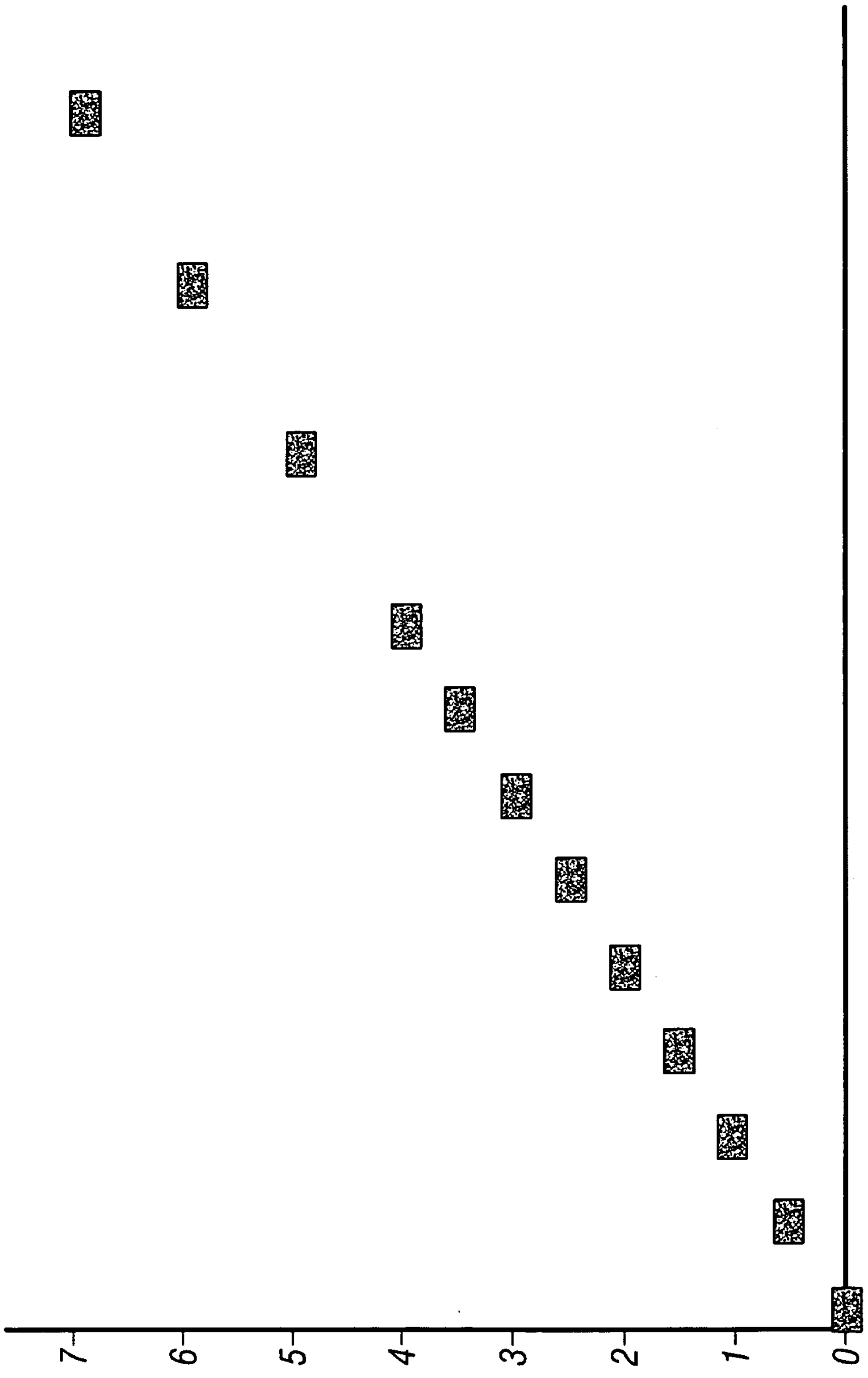
FIG. 22 is a chart illustrating the quantization steps and quantization levels provided by the schematic of FIG. 16.

The two modulators 161, 162 of FIG. 16 having the hysteresis curves 810, 808 of FIG. 17 are used in certain embodiments to provide a higher bit density at lower intensity ranges than at higher intensity ranges. For example, in the sequence of levels 0 through 7 that can be provided by each column (e.g., as depicted in FIG. 20), the modulator 161 is actuated or placed in an "on" state only for levels 4 and above. Thus, for all quantization steps below level 4, the actuation drive voltage on the modulators 161, 162 can be reduced so that only the modulator 162 is selectively actuated. Since this modulator 162 has a mirror with preferably about one-half the optical weight of the mirror of the modulator 164, the modulators 162, 164, and 163 have weights in the ratio 1:2:4, respectively, and can be used to generate eight quantization steps below quantization level 4, as illustrated in FIG. 21. The quantization steps below level 4 are illustrated in FIG. 22. Similarly, the two modulators 161, 162 of FIG. 16 having the hysteresis curves 814, 812 of FIG. 18 are used in certain other embodiments to provide a higher bit density at lower intensity ranges than at higher intensity ranges.

Referring again to FIG. 16, when the mirrors 164, 163, 162, 161 subtend the pixel in a ratio of 2:4:1:7, respectively, the number of sequential quantization steps are more than doubled in the lower portion of the display intensity range, which is the portion of the quantization range most in need of finer quantization. For example, comparing FIGS. 20 and 22, the number of sequential quantization steps for intensities below level 4 (i.e., eight) in FIG. 22 is more than double the number of sequential quantization steps for intensities above level 4 (i.e., three) in either FIG. 20 or FIG. 22. That is, rather than actuating and releasing three modulators to achieve seven quantization steps, four of which are below the fourth quantization level, as depicted in FIGS. 19 and 20, four modulators are actuated and released to provide eleven quantization steps, eight of which are below the fourth quantization level, as depicted in FIGS. 21 and 22. As used herein, the term "quantization step" refers to the change from one amount of intensity to the next amount of intensity and the term "quantization level" refers to the change from one bit depth to the next bit depth. For example, the change in intensity from one modulator to the next in the top row of FIG. 21 is a quantization step, but not a quantization level, while the change in intensity from one modulator to the next modulator in the bottom row of FIG. 21 is both a quantization step and a quantization level. It will be appreciated that the effect is much more pronounced at bit depths greater than 3-bit.

Figure 23:
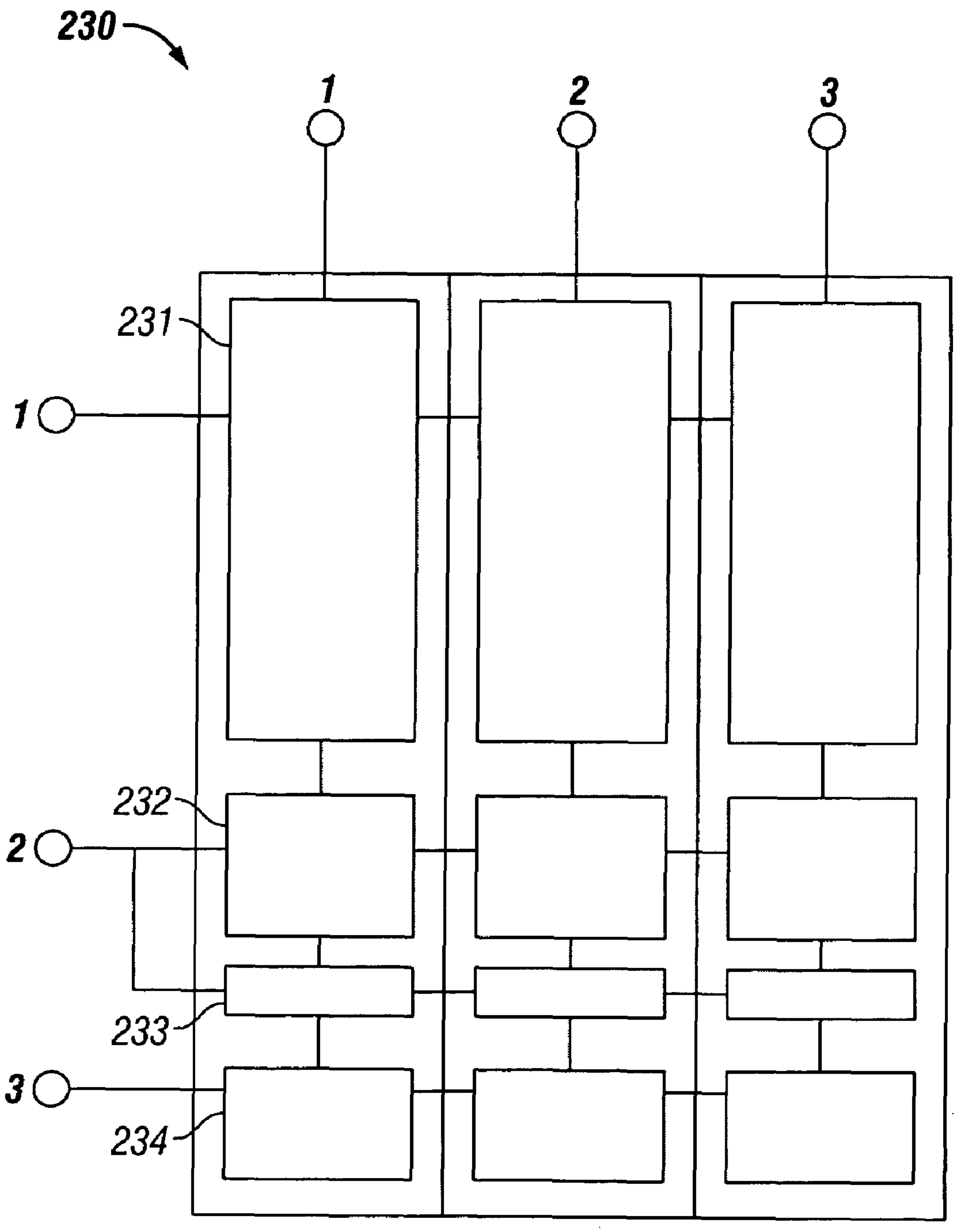
FIG. 23 is a schematic diagram of another embodiment of the interferometric modulator in which the rows have been subdivided into four subrows and in which two subrows are configure to communicate with a common row driver connection.

FIG. 23 is a schematic diagram of an embodiment of a color interferometric modulator pixel 230. Although FIG. 23 represents an embodiment partitioning the modulators 102, 105, and 108 in FIG. 10, such partitioning may also be appropriate for grayscale displays (e.g., by partitioning the modulator 92 depicted in FIG. 9). In the embodiment illustrated in FIG. 23, the modulator 104 has been divided into two modulators 232, 233 (or "display elements") arranged in subrows that are configured to communicate with a common row conduit. In FIG. 10, the modulator 102 subtends about 2/7 of the area of the first column. When partitioned as in FIG. 23, the modulator 232 subtends about 3/14 of the first column and the modulator 233 subtends about 1/14 of the first column. When both of the modulators 232, 233 are driven together, the function of the pixel 200 is unchanged from the pixel 100 schematically depicted in FIG. 10. The hysteresis loops for the modulators 232, 233 may share a common actuation voltage or a common release voltage as displayed in FIGS. 17 and 18.

Figure 24:
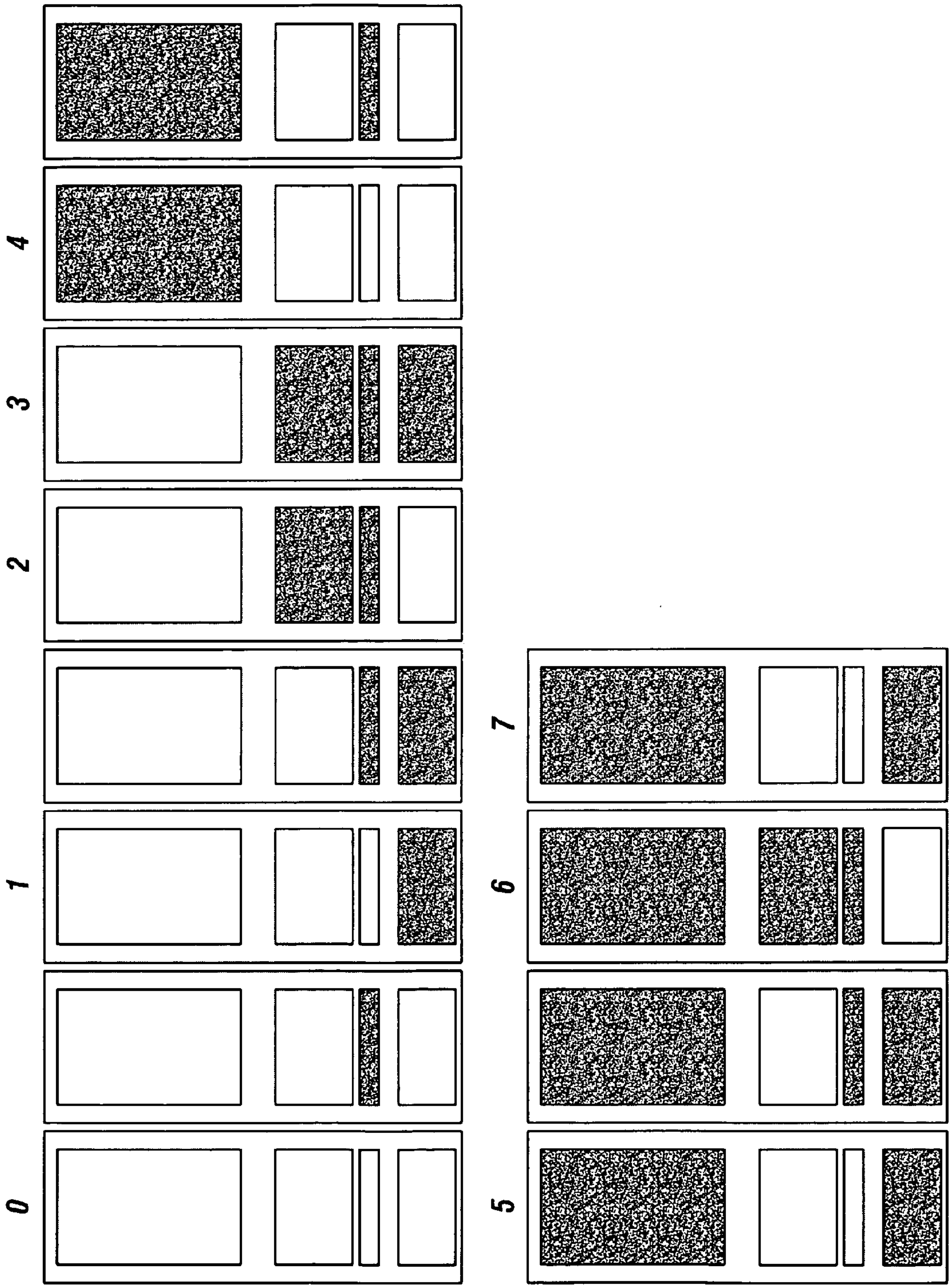
FIG. 24 schematically illustrates the quantization steps and quantization levels provided by the schematic of FIG. 23.
Figure 25:
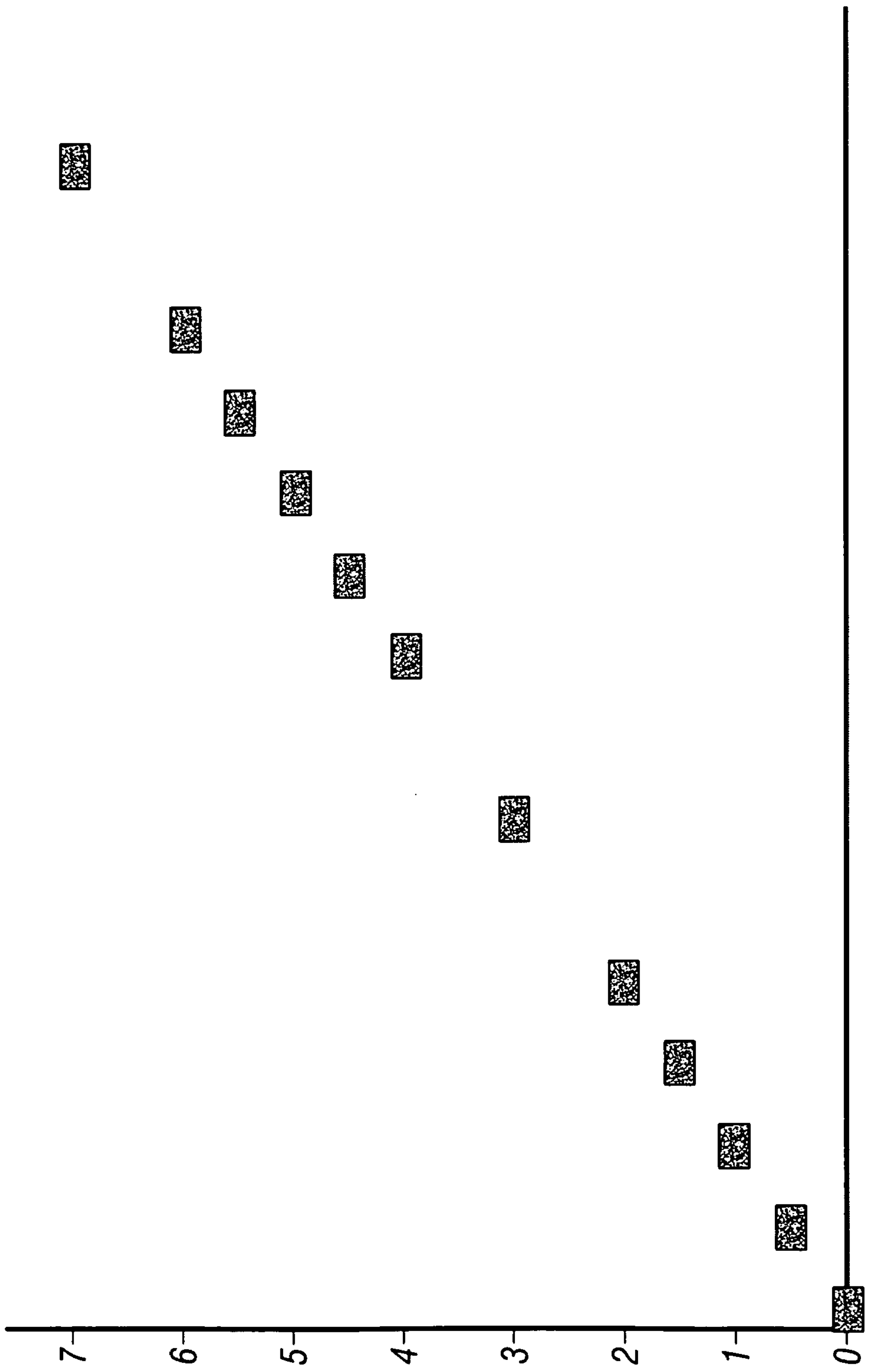
FIG. 25 is a chart illustrating the quantization steps and quantization levels provided by the schematic of FIG. 23.

When the modulators 234, 233, 232, 231 subtend the pixel in a ratio of 2:1:3:8, respectively, the number of sequential quantization steps (i.e., two) are doubled below level 2 of the display quantization range, which is part of. the portion of the quantization range most in need of finer quantization. Rather than actuating and releasing four modulators to provide eleven quantization steps, eight of which are below the fourth quantization level, as depicted in FIGS. 21 and 22, four modulators are actuated and released to provide eleven quantization steps, six of which are below the fourth quantization level, as depicted in FIGS. 24 and 25. Because the schematic illustrated in FIG. 16 provides finer quantization steps between level 2 and level 4, partitioning the mirror 101 of FIG. 10 is preferred to partitioning the mirror 104 of FIG. 10.

Figure 26:
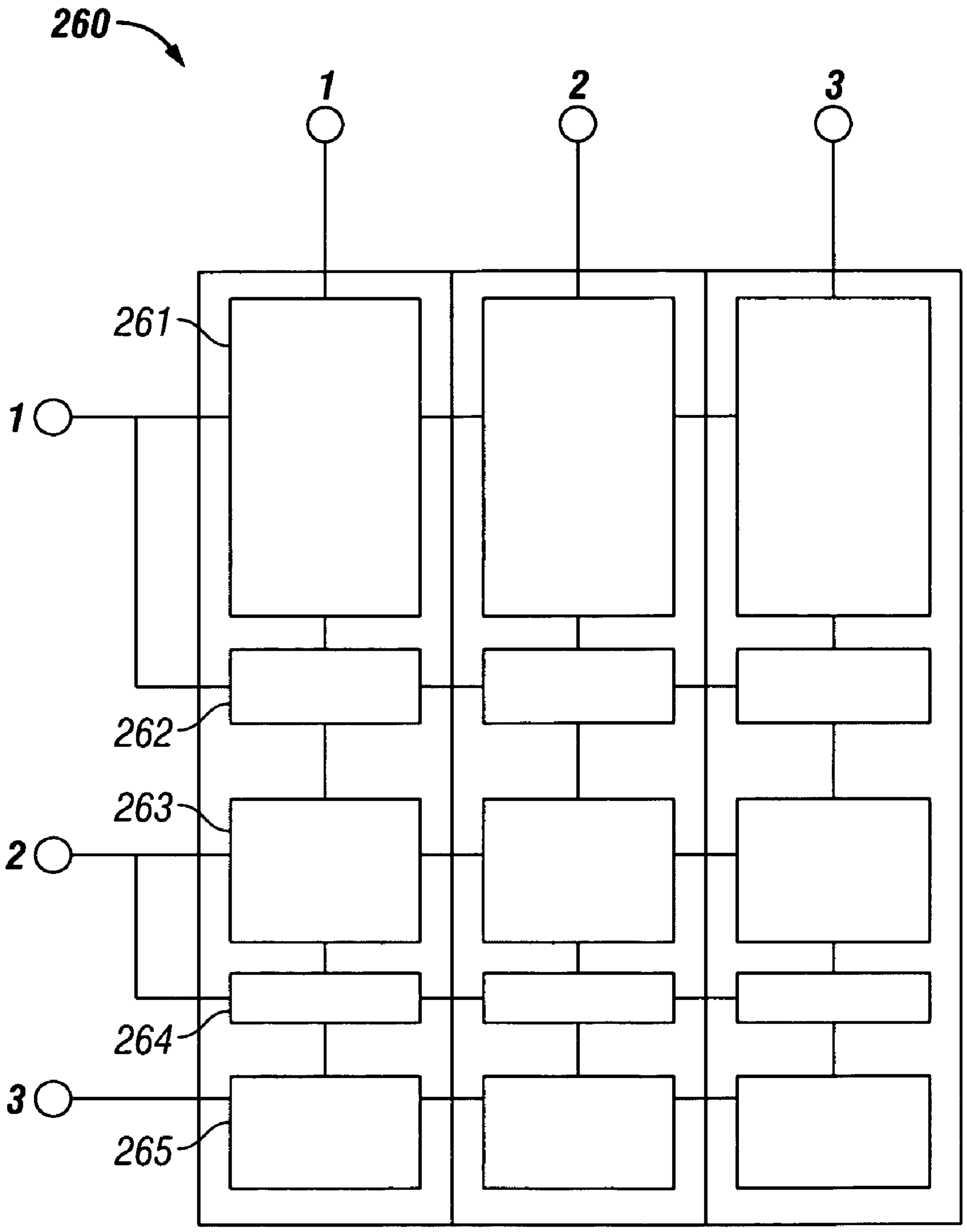
FIG. 26 is a schematic diagram of an embodiment of the interferometric modulator in which the rows have been subdivided into five subrows, in which two subrows are configured to communicate with one common row driver connection, and in which two other subrows are configured to communicate with another common row driver connection.
Figure 27:
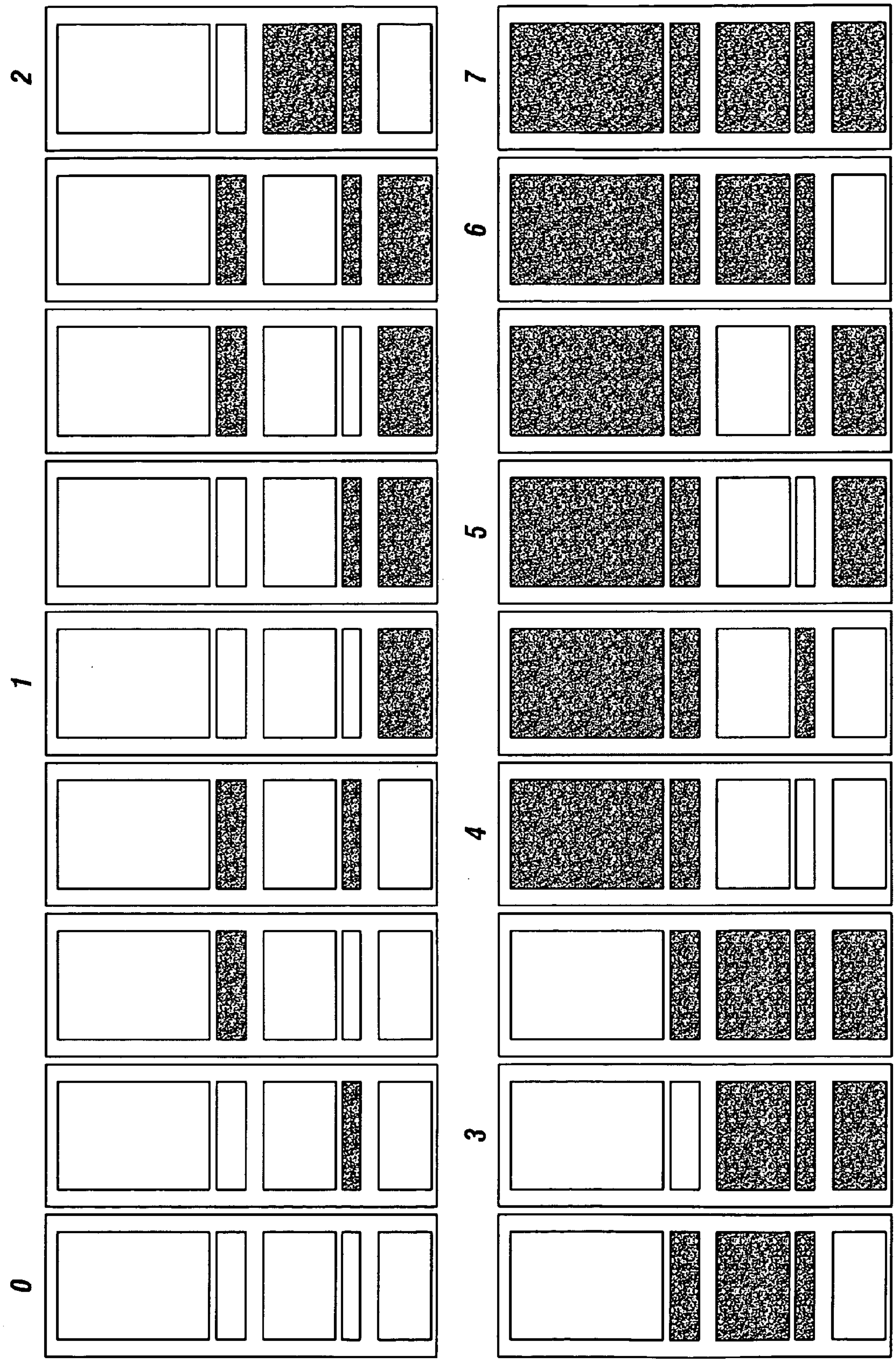
FIG. 27 schematically illustrates the quantization steps and quantization levels provided by the schematic of FIG. 26.
Figure 28:
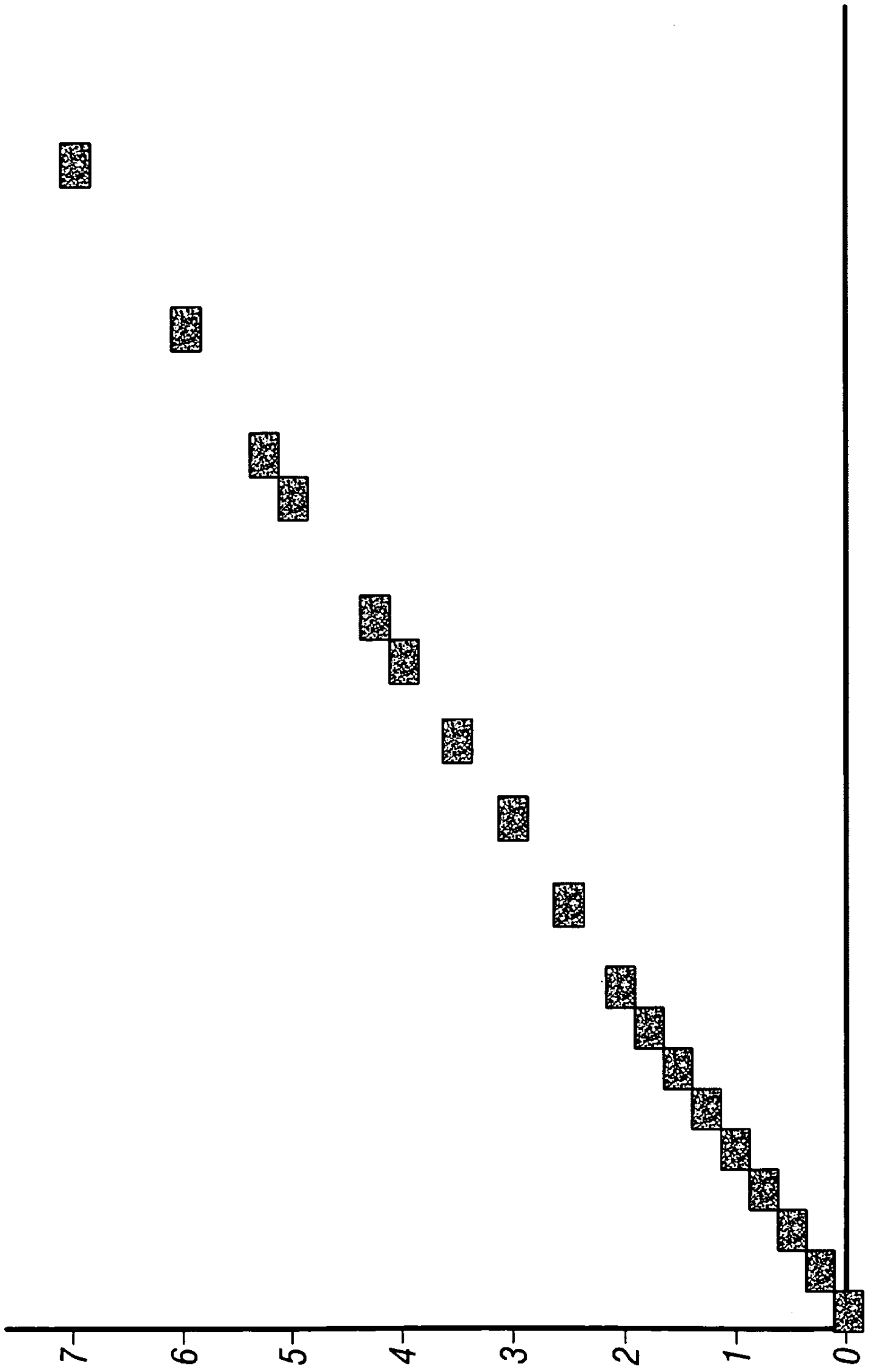
FIG. 28 is a chart illustrating the quantization steps and quantization levels provided by the schematic of FIG. 26.

Even finer quantization may be created by partitioning both the mirror 101 and the mirror 104 depicted in FIG. 10, as illustrated by the schematic diagram in FIG. 26. As shown by FIGS. 27 and 28, such a schematic results in 17 quantization steps, 12 of which are below the fourth quantization level. For another example of the difference between a "quantization step" and a "quantization level, the change in intensity from the second modulator from the left in the top row of FIG. 27 to the third modulator from the left in the top row of FIG. 27 is a quantization step, while the change in intensity from the first modulator from the left in the top row of FIG. 27 to the fifth modulator from the left in the top row of FIG. 27 is a quantization level.

Figure 29:
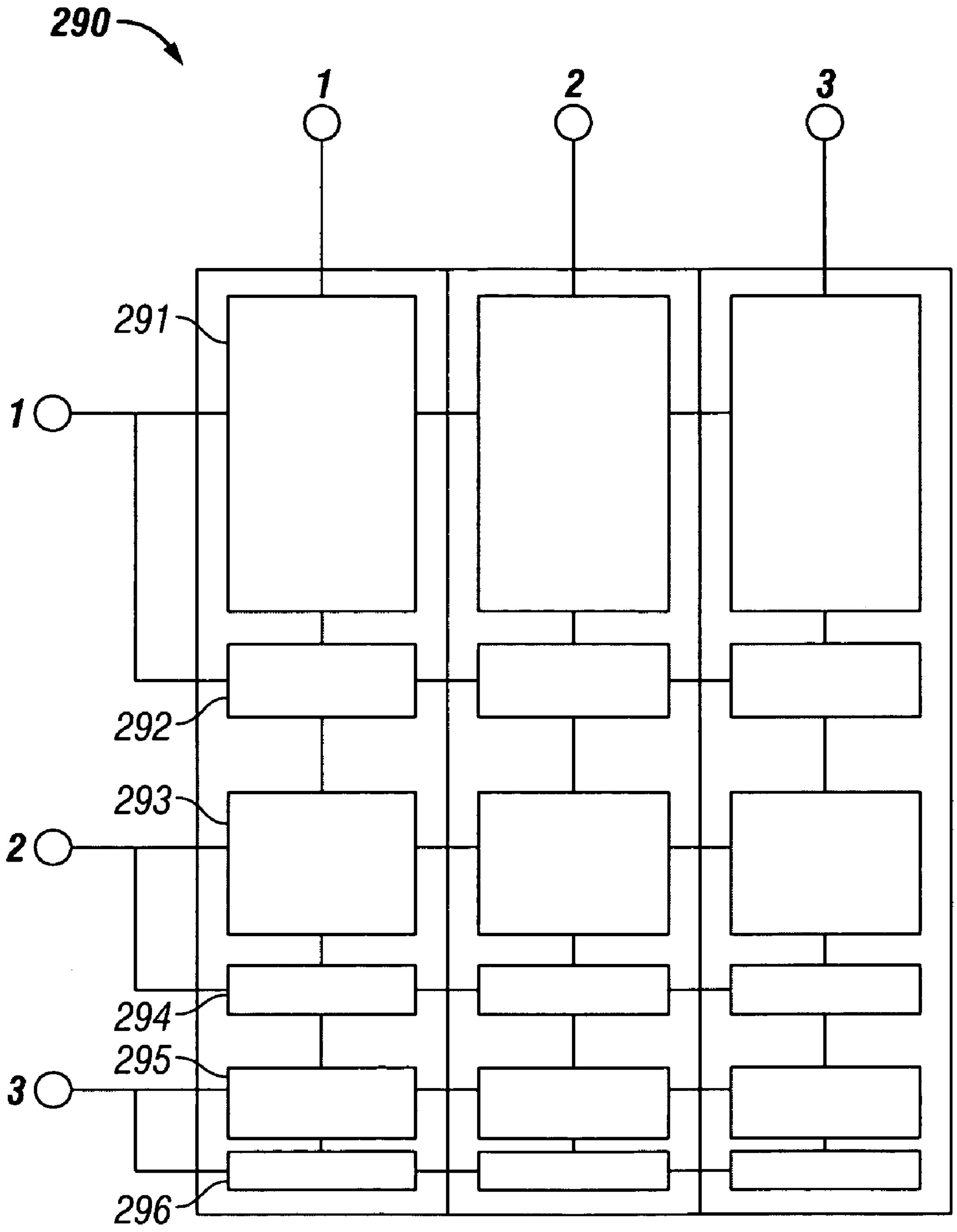
FIG. 29 is a partial schematic diagram of an embodiment of an interferometric modulator in which the rows have been subdivided into six subrows, in which two subrows are configured to communicate with one common row driver connection, in which two other subrows are configured to communicate with another common row driver connection, and in which the remaining two subrows are configured to communicate with yet another common row driver connection.
Figure 30:
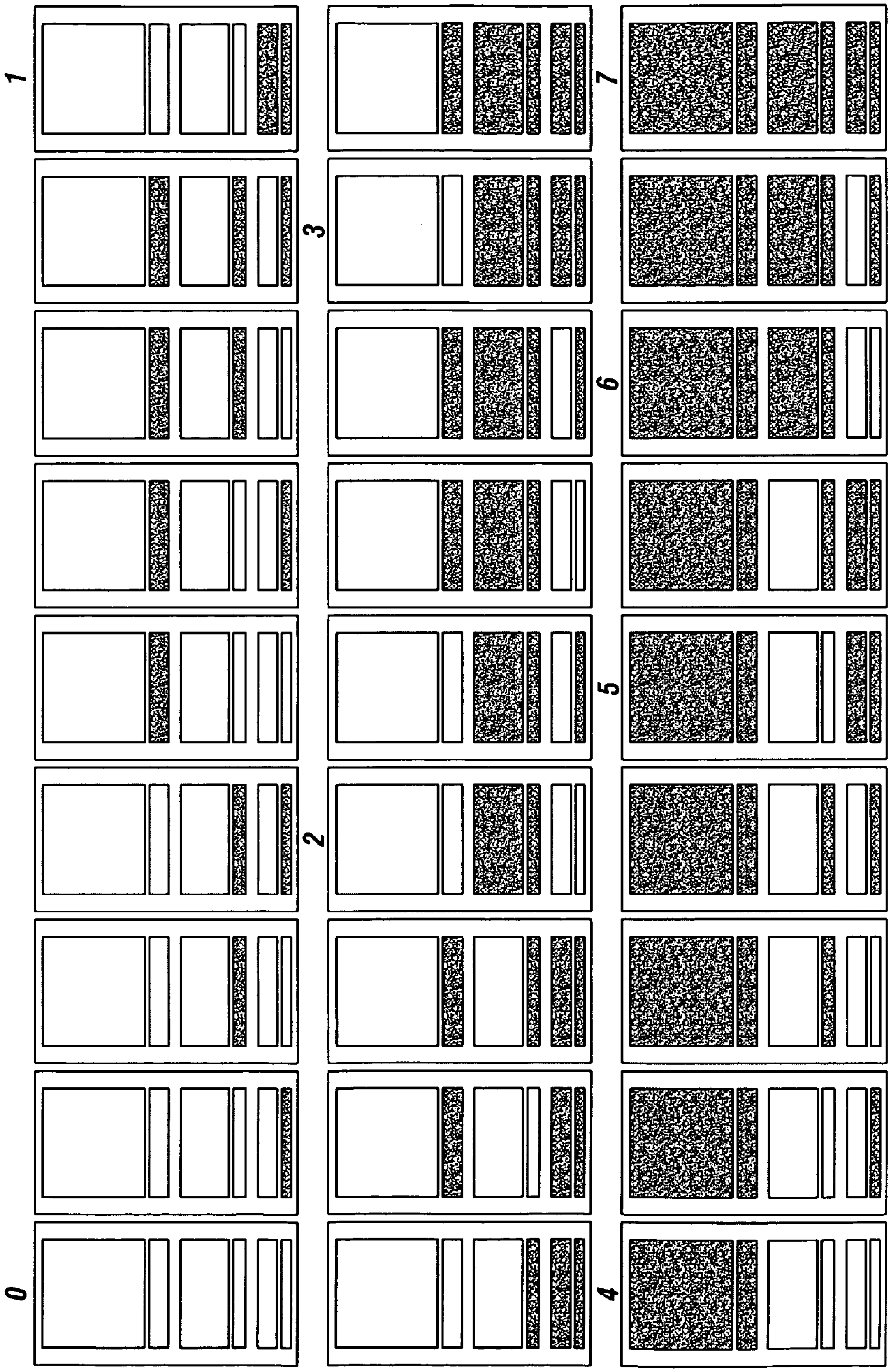
FIG. 30 schematically illustrates the quantization steps and quantization levels provided by the schematic of FIG. 29.

Still finer quantization may be achieved by partitioning all three mirrors 101, 104, and 107 in FIG. 10, as illustrated by the schematic diagram in FIG. 29. As shown by FIG. 30, such a configuration results in 26 quantization steps, 18 of which are below the fourth quantization level. Thus, while maintaining only six total leads to a color pixel, the number of quantization steps advantageously increases from 7 to 26, most of which are in the region of low intensity most in need of finer quantization. This configuration dramatically reduces quantization level spacing at low intensities, the display range where it is most needed, without increasing the number of address lines from the driver IC.

Various specific embodiments have been described above. Although the invention has been described with reference to these specific embodiments, the descriptions are intended to be illustrative of the invention and are not intended to be limiting. Various modifications and applications may occur to those skilled in the art without departing from the true scope of the invention as defined in the appended claims.

What is claimed is:

1. A light modulator device comprising:

a first electrical conduit;

a second electrical conduit electrically isolated from the first conduit;

a first display element configured to communicate with the first conduit and the second conduit, the first display element in an actuated state when a voltage difference between the first conduit and the second conduit has a magnitude greater than a first actuation voltage, the first display element in a released state when the voltage difference between the first conduit and the second conduit has a magnitude less than a first release voltage; and a second display element configured to communicate with the first conduit and the second conduit, the second display element in an actuated state when a voltage difference between the first conduit and the second conduit has a magnitude greater than a second actuation voltage, the second display element in a released state when the voltage difference between the first conduit and the second conduit has a magnitude less than a second release voltage, wherein either the first actuation voltage is substantially equal to the second actuation voltage and the first release voltage is different from the second release voltage or the first actuation voltage is different from the second actuation voltage and the first release voltage is substantially equal to the second release voltage.

2. The light modulator device of claim 1, wherein the first actuation voltage is substantially equal to the second actuation voltage and wherein the first release voltage is different from the second release voltage.

3. The light modulator device of claim 1, wherein the first release voltage is substantially equal to the second release voltage and wherein the first actuation voltage is different from the second actuation voltage.

4. The light modulator device of claim 1, wherein the first display element has a first optically active area and the second display element has a second optically active area, wherein the ratio of the first optically active area to the second optically active area is approximately equal to an integer to one.

5. The light modulator device of claim 4, wherein the integer is 2, 3, 4, 5, 6, 7, 8, 9, or 10.

6. The light modulator device of claim 4, wherein the integer is 3, 7, 15, 31, 63, 127, or 255.

7. The light modulator device of claim 1, wherein the first display element is an interferometric display element and the second display element is an interferometric display element.

8. The light modulator device of claim 1, wherein the device comprises an array of pixels, the first display element and the second display element in the same pixel.

9. The light modulator of claim 1, wherein a magnitude of the first release voltage is less than a magnitude of the first actuation voltage.

10. The light modulator of claim 9, wherein a magnitude of the second actuation voltage is greater than a magnitude of the second release voltage.

11. A display including the light modulator of claim 1, comprising:

a processor that is configured to communicate with said display, said processor being configured to process image data; and a memory device that is configured to communicate with said processor.

12. The display as recited in claim 11, further comprising a driver circuit configured to send at least one signal to said display.

13. The display as recited in claim 12, further comprising a controller configured to send at least a portion of said image data to said driver circuit.

14. The display as recited in claim 11, further comprising an image source module configured to send said image data to said processor.

15. The display as recited in claim 14, wherein said image source module comprises at least one of a receiver, transceiver, and transmitter.

16. The display as recited in claim 11, further comprising an input device configured to receive input data and to communicate said input data to said processor.

17. A light modulator device comprising:

a first means for conducting electrical signals;

a second means for conducting electrical signals, the second conducting means electrically isolated from the first conducting means;

a first means for modulating light configured to communicate with the first conducting means and the second conducting means, the first modulating means in an actuated state when a voltage difference between the first conducting means and the second conducting means has a magnitude greater than a first actuation voltage, the first modulating means in a released state when the voltage difference between the first conducting means and the second conducting means has a magnitude less than a first release voltage; and a second means for modulating light configured to communicate with the first conducting means and the second conducing means, the second modulating means in an actuated state when a voltage difference between the first conducting means and the second conducting means has a magnitude greater than a second actuation voltage, the second modulating means in a released state when the voltage difference between the first conducting means and the second conducting means has a magnitude less than a second release voltage, wherein either the first actuation voltage is substantially equal to the second actuation voltage and the first release voltage is different from the second release voltage or the first actuation voltage is different from the second actuation voltage and the first release voltage is substantially equal to the second release voltage.

18. The light modulator device of claim 17, wherein the first conducting means comprises an electrical conduit.

19. The light modulator device of claim 17, wherein the second conducting means comprises an electrical conduit.

20. The light modulator device of claim 17, wherein the first modulating means comprises an interferometric modulator.

21. The light modulator device of claim 17, wherein the second modulating means comprises an interferometric modulator.

22. A method of manufacturing a light modulator device, the method comprising:

forming a first electrical conduit;

forming a second electrical conduit electrically isolated from the first conduit;

forming a first display element configured to communicate with the first conduit and the second conduit, the first display element in an actuated state when a voltage difference between the first conduit and the second conduit has a magnitude greater than a first actuation voltage, the first display element in a released state when the voltage difference between the first conduit and the second conduit has a magnitude less than a first release voltage; and forming a second display element configured to communicate with the first conduit and the second conduit, the second display element in an actuated state when a voltage difference between the first conduit and the second conduit has a magnitude greater than a second actuation voltage, the second display element in a released state when the voltage difference between the first conduit and the second conduit has a magnitude less than a second release voltage, wherein either the first actuation voltage is substantially equal to the second actuation voltage and the first release voltage is different from the second release voltage or the first actuation voltage is different from the second actuation voltage and the first release voltage is substantially equal to the second release voltage.

23. A light modulator device fabricated by the method of claim 22.

* * * * *

UNITED STATES PATENT AND TRADEMARK OFFICE

CERTIFICATE OF CORRECTION

PATENT NO. : 7,471,442 B2
APPLICATION NO. : 11/454162
DATED : December 30, 2008
INVENTOR(S) : Jeffrey B. Sampsell It is certified that error appears in the above-identified patent and that said Letters Patent is hereby corrected as shown below:

Title Page 1, Line 2, delete "ENHANCEMENTS", and please insert --ENHANCEMENT--, therefor.

Title Page 5, Column 2, Line 3, under Other Publications, delete "curcuit", and please insert --circuit--, therefor.

Title Page 5, Column 2, Line 13, under Other Publications, delete "Quanum", and please insert --Quantum--, therefor.

Title Page 5, Column 2, Line 30, under Other Publications, delete "SiO2", and please insert --$SiO_2$,--, therefor.

Title Page 6, Column 1, Line 6, under Other Publications, delete "Filters", and please insert --Filter--, therefor.

At Column 1, Line 2, delete "ENHANCEMENTS", and please insert --ENHANCEMENT--, therefor.

At Column 4, Line 17, delete "interferometic", and please insert --interferometric--, therefor.

At Column 6, Lines 7-15, delete "The depicted..............stack 16b.", and please insert the same as a new paragraph on column 6, line 8.

At Column 15, Line 29, before "When", please delete "J".

At Column 18, Line 10, delete "of.", and please insert --of--, therefor.

Signed and Sealed this

Twenty-second Day of June, 2010

David J. Kappos
*Director of the United States Patent and Trademark Office*